(12) United States Patent
Hayward

(10) Patent No.: US 10,215,573 B1
(45) Date of Patent: *Feb. 26, 2019

(54) USING TRAIN TELEMATICS DATA TO REDUCE ACCIDENT RISK

(71) Applicant: STATE FARM MUTUAL AUTOMOBILE INSURANCE COMPANY, Bloomington, IL (US)

(72) Inventor: Gregory Hayward, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/798,019

(22) Filed: Oct. 30, 2017

Related U.S. Application Data

(63) Continuation of application No. 14/990,139, filed on Jan. 7, 2016, now Pat. No. 9,841,286.

(Continued)

(51) Int. Cl.
*G01C 21/00* (2006.01)
*G01C 21/34* (2006.01)
(Continued)

(52) U.S. Cl.
CPC ....... *G01C 21/3415* (2013.01); *G01C 21/005* (2013.01); *G01C 21/3492* (2013.01);
(Continued)

(58) Field of Classification Search
CPC ............ G01C 21/3415; G01C 21/3492; G01C 21/005; G01C 21/36; G06Q 40/08;
(Continued)

(56) References Cited

U.S. PATENT DOCUMENTS

| 6,437,688 B1 | 8/2002 | Kobayashi |
| 8,935,036 B1 * | 1/2015 | Christensen ........... G07C 5/008 |
| | | 701/29.1 |

(Continued)

OTHER PUBLICATIONS

U.S. Appl. No. 14/798,609, Methods of Providing Insurance Savings Based Upon Telematics and Anonymous Driver Data, filed Jul. 14, 2015.

(Continued)

*Primary Examiner* — Yuen H Wong
(74) *Attorney, Agent, or Firm* — Marshall, Gerstein & Borun LLP; Randall G. Rueth

(57) ABSTRACT

A computer system configured to use train telematics data may be mounted on or within an autonomous vehicle, and which may be configured to (1) receive train telematics data associated with a train that includes GPS location, speed, route, heading, acceleration, and/or track data; (2) determine, based upon the train telematics data, when, or a time period of when, the train will pass through, be passing through, and/or be within a predetermined distance of a railroad crossing; (3) determine an alternate route for the autonomous vehicle to take to avoid waiting at the railroad crossing; and (4) direct the autonomous vehicle to automatically travel along the alternate route or automatically stop at the railroad crossing to allow the train to pass unimpeded and to facilitate avoidance of train-vehicle collisions. Insurance discounts may be generated based upon the risk mitigation or prevention functionality.

20 Claims, 8 Drawing Sheets

Related U.S. Application Data

(60) Provisional application No. 62/250,286, filed on Nov. 3, 2015, provisional application No. 62/247,334, filed on Oct. 28, 2015, provisional application No. 62/232,035, filed on Sep. 24, 2015, provisional application No. 62/232,045, filed on Sep. 24, 2015, provisional application No. 62/232,054, filed on Sep. 24, 2015, provisional application No. 62/232,050, filed on Sep. 24, 2015, provisional application No. 62/232,065, filed on Sep. 24, 2015, provisional application No. 62/232,097, filed on Sep. 24, 2015, provisional application No. 62/232,083, filed on Sep. 24, 2015, provisional application No. 62/232,075, filed on Sep. 24, 2015, provisional application No. 62/232,090, filed on Sep. 24, 2015, provisional application No. 62/207,561, filed on Aug. 20, 2015, provisional application No. 62/204,749, filed on Aug. 13, 2015, provisional application No. 62/113,749, filed on Feb. 9, 2015, provisional application No. 62/105,468, filed on Jan. 20, 2015.

(51) Int. Cl.
| | |
|---|---|
| *G06Q 40/08* | (2012.01) |
| *G05D 1/02* | (2006.01) |
| *G01S 19/47* | (2010.01) |
| *G01S 19/50* | (2010.01) |
| *G01S 19/51* | (2010.01) |
| *G01C 21/36* | (2006.01) |

(52) U.S. Cl.
CPC .............. *G01C 21/36* (2013.01); *G01S 19/47* (2013.01); *G01S 19/50* (2013.01); *G01S 19/51* (2013.01); *G05D 1/0278* (2013.01); *G06Q 40/08* (2013.01)

(58) Field of Classification Search
CPC .......... G01S 19/50; G01S 19/47; G01S 19/51; G05D 1/0278
See application file for complete search history.

(56) References Cited

U.S. PATENT DOCUMENTS

| | | | |
|---|---|---|---|
| 9,047,778 B1* | 6/2015 | Cazanas ................. | G08G 1/166 |
| 9,129,449 B2 | 9/2015 | Davidson | |
| 9,679,487 B1 | 6/2017 | Hayward | |
| 9,783,159 B1 | 10/2017 | Potter et al. | |
| 9,786,154 B1 | 10/2017 | Potter et al. | |
| 2007/0054685 A1 | 3/2007 | Kellum | |
| 2007/0159354 A1 | 7/2007 | Rosenberg | |
| 2010/0015963 A1 | 1/2010 | Hesse et al. | |
| 2010/0191391 A1 | 7/2010 | Zeng | |
| 2010/0286864 A1 | 11/2010 | Kawauchi et al. | |
| 2013/0030642 A1 | 1/2013 | Bradley et al. | |
| 2013/0090139 A1 | 4/2013 | McHenry et al. | |
| 2013/0169812 A1 | 7/2013 | Lu et al. | |
| 2014/0081675 A1 | 3/2014 | Ives et al. | |
| 2014/0320260 A1 | 10/2014 | Van Wiemeersch et al. | |
| 2015/0077236 A1 | 3/2015 | Le Masurier | |
| 2015/0145995 A1 | 5/2015 | Shahraray et al. | |
| 2015/0179062 A1* | 6/2015 | Ralston ................. | G01C 21/26 701/117 |
| 2015/0262487 A1 | 9/2015 | Cazanas et al. | |
| 2016/0021178 A1 | 1/2016 | Liu et al. | |
| 2016/0232791 A1 | 8/2016 | Tosa et al. | |
| 2016/0277601 A1 | 9/2016 | Seymour | |
| 2016/0334227 A1 | 11/2016 | Davidson | |

OTHER PUBLICATIONS

U.S. Appl. No. 14/798,615, Methods of Providing Insurance Savings Based Upon Telematics and Driving Behavior Identification, filed Jul. 14, 2015.
U.S. Appl. No. 14/798,626, Methods of Providing Insurance Savings Based Upon Telematics and Usage-Based Insurance, filed Jul. 14, 2015.
U.S. Appl. No. 14/798,633, Methods of Providing Insurance Savings Based Upon Telematics and Insurance Incentives, filed Jul. 14, 2015.
U.S. Appl. No. 14/798,741, Methods of Determining Accident Cause and/or Fault Using Telematics Data, filed Jul. 14, 2015.
U.S. Appl. No. 14/798,745, Methods of Reconstructing an Accident Scene Using Telematics Data filed Jul. 14, 2015.
U.S. Appl. No. 14/798,750, Methods of Insurance Claim Buildup Detection Using Telematics Data, filed Jul. 14, 2015.
U.S. Appl. No. 14/798,757, Methods of Facilitating Emergency Assistance, filed Jul. 14, 2015.
U.S. Appl. No. 14/798,763, Methods of Intelligent Routing, filed Jul. 14, 2015.
U.S. Appl. No. 14/798,769, Methods of Theft Prevention or Mitigation, filed Jul. 14, 2015.
U.S. Appl. No. 14/798,770, Methods of Pre-Generating Insurance Claims, filed Jul. 14, 2015.
U.S. Appl. No. 14/989,946, Alert Notifications Utilizing Broadcasted Telematics Data, filed Jan. 7, 2016.
U.S. Appl. No. 14/989,946, Nonfinal Office Action, dated Dec. 9, 2016.
U.S. Appl. No. 14/989,946, Notice of Allowance, dated Mar. 17, 2017.
U.S. Appl. No. 14/989,950, Advisory Action, dated Jun. 21, 2017.
U.S. Appl. No. 14/989,950, Broadcasting Telematics Data to Nearby Mobile Computing Devices, Vehicles, and Infrastructure, filed Jan. 7, 2016.
U.S. Appl. No. 14/989,950, Final Office Action, dated Apr. 19, 2017.
U.S. Appl. No. 14/989,950, Nonfinal Office Action, dated Nov. 18, 2016.
U.S. Appl. No. 14/989,950, Notice of Allowance, dated Sep. 12, 2017.
U.S. Appl. No. 14/989,979, Advisory Action, dated Jun. 26, 2017.
U.S. Appl. No. 14/989,979, Determining Abnormal Traffic Conditions from a Broadcast of Telematics Data Originating from Another Vehicle, filed Jan. 7, 2016.
U.S. Appl. No. 14/989,979, Final Office Action, dated Apr. 24, 2017.
U.S. Appl. No. 14/989,979, Nonfinal Office Action, datled Nov. 30, 2016.
U.S. Appl. No. 14/989,979, Notice of Allowance, dated Sep. 14, 2017.
U.S. Appl. No. 14/989,990, Taking Corrective Action Based Upon Telematics Data Broadcast from Another Vehicle, filed Jan. 7, 2016.
U.S. Appl. No. 14/990,056, Advisory Action, dated Jul. 6, 2017.
U.S. Appl. No. 14/990,056, Analyzing Telematics Data to Determine Travel Events and Corrective Actions, filed Jan. 7, 2016.
U.S. Appl. No. 14/990,056, Final Office Action, dated Apr. 21, 2017.
U.S. Appl. No. 14/990,056, Nonfinal Office Action, dated Dec. 1, 2016.
U.S. Appl. No. 14/990,056, Notice of Allowance, dated Sep. 13, 2017.
U.S. Appl. No. 14/990,073, Providing Insurance Discounts Based Upon Usage of Telematics Data-Based Risk Mitigation and Prevention Functionality, filed Jan. 7, 2016.
U.S. Appl. No. 14/990,116, Notice of Allowance, dated Sep. 13, 2017.
U.S. Appl. No. 14/990,116, Advisory Action, dated Jun. 28, 2017.
U.S. Appl. No. 14/990,116, Determining Corrective Actions Based Upon Broadcast of Telematics Data Originating From Another Vehicle, filed Jan. 7, 2016.
U.S. Appl. No. 14/990,116, Final Office Action, dated Apr. 19, 2017.
U.S. Appl. No. 14/990,116, Nonfinal Office Action, dated Nov. 25, 2016.
U.S. Appl. No. 14/990,121, Advisory Action, dated Jul. 17, 2017.

(56) References Cited

OTHER PUBLICATIONS

U.S. Appl. No. 14/990,121, Facilitating Safer Vehicle Travel Utilizing Telematics Data, filed Jan. 7, 2016.
U.S. Appl. No. 14/990,121, Final Office Action, dated Apr. 19, 2017.
U.S. Appl. No. 14/990,121, Nonfinal Office Action, dated Dec. 15, 2016.
U.S. Appl. No. 14/990,121, Notice of Allowance, dated Oct. 10, 2017.
U.S. Appl. No. 14/990,139, Final Office Action, dated Apr. 19, 2017.
U.S. Appl. No. 14/990,139, Nonfinal Office Action, dated Nov. 18, 2016.
U.S. Appl. No. 14/990,139, Notice of Allowance, dated Aug. 14, 2017.
U.S. Appl. No. 14/990,139, Using Train Telematics Data to Reduce Accident Risk, filed Jan. 7, 2016.
U.S. Appl. No. 14/990,165, Final Office Action, dated Apr. 19, 2017.
U.S. Appl. No. 14/990,165, Nonfinal Office Action, dated Nov. 23, 2016.
U.S. Appl. No. 14/990,165, Notice of Allowance, dated Aug. 10, 2017.
U.S. Appl. No. 14/990,165, Using Train Telematics Data to Provide Information in One or More Vehicles to Reduce Accident Risk, filed Jan. 7, 2016.
U.S. Appl. No. 14/990,209, Corrected Notice of Allowability, dated Aug. 28, 2017.
U.S. Appl. No. 14/990,209, Final Office Action, dated Apr. 20, 2017.
U.S. Appl. No. 14/990,209, Nonfinal Office Action, dated Nov. 18, 2016.
U.S. Appl. No. 14/990,209, Notice of Allowance, dated Aug. 16, 2017.
U.S. Appl. No. 14/990,209, Using Emergency Response System (EMS) Vehicle Telematics Data to Reduce Accident Risk, filed Jan. 7, 2016.
U.S. Appl. No. 14/990,228, Broadcasting Information Related to Hazards Impacting Vehicle Travel, filed Jan. 7, 2016.
U.S. Appl. No. 14/990,228, Final Office Action, dated Apr. 20, 2017.
U.S. Appl. No. 14/990,228, Nonfinal Office Action, dated Dec. 15, 2016.
U.S. Appl. No. 14/990,228, Notice of Allowance, dated Aug. 31, 2017.
U.S. Appl. No. 15/484,791, Alert Notifications Utilizing Broadcasted Telematics Data, filed Apr. 11, 2017.
U.S. Appl. No. 15/484,791, Nonfinal Office Action, dated Oct. 18, 2017.
U.S. Appl. No. 15/787,293, Broadcasting Telematics Data to Nearby Mobile Computing Devices, Vehicles, and Infrastructure, filed Oct. 18, 2017.
U.S. Appl. No. 15/787,305, Determining Abnormal Traffic Conditions From a Broadcast of Telematics Data Originating From Another Vehicle, filed Oct. 18, 2017.
U.S. Appl. No. 15/787,311, Analyzing Telematics Data to Determine Travel Events and Corrective Actions, filed Oct. 18, 2017.
U.S. Appl. No. 15/787,317, Determining Corrective Actions Based Upon Broadcast of Telematics Data Originating From Another Vehicle, filed Oct. 18, 2017.
U.S. Appl. No. 15/798,062, Using Train Telematics Data to Provide Information in One or More Vehicles to Reduce Accident Risk, filed Oct. 30, 2017.
U.S. Appl. No. 15/798,093, Using Emergency Response System (EMS) Vehicle Telematics Data to Reduce Accident Risk, filed Oct. 30, 2017.
U.S. Appl. No. 15/798,107, Broadcasting Information Related to Hazards Impacting Vehicle Travel, filed Oct. 30, 2017.

\* cited by examiner

USING TRAIN TELEMATICS DATA TO REDUCE ACCIDENT RISK

CROSS REFERENCE TO RELATED APPLICATIONS

This application is a continuation of U.S. patent application Ser. No. 14/990,139, which is entitled "Using Train Telematics Data To Reduce Accident Risk," which was filed Jan. 7, 2016, and which claims the benefit of (1) U.S. Provisional Patent Application No. 62/105,468, entitled "Broadcasting Telematics Data To Nearby Mobile computing devices, Vehicles, And Infrastructure," filed Jan. 20, 2015, (2) U.S. Provisional Patent Application No. 62/113,749, entitled "Broadcasting Telematics Data To Nearby Mobile computing devices, Vehicles, And Infrastructure," filed Feb. 9, 2015, (3) U.S. Provisional Patent Application No. 62/204,749, entitled "Broadcasting Telematics Data To Nearby Mobile computing devices, Vehicles, And Infrastructure," filed Aug. 13, 2015, (4) U.S. Provisional Patent Application No. 62/207,561, entitled "Generating Alert Notifications By Broadcasting Telematics Data To Nearby Mobile computing devices, Vehicles, And Infrastructure," filed Aug. 20, 2015, (5) U.S. Provisional Patent Application No. 62/232,035 entitled "Generating Alert Notifications By Broadcasting Telematics Data To Nearby Mobile computing devices, Vehicles, And Infrastructure," filed Sep. 24, 2015, (6) U.S. Provisional Patent Application No. 62/232,045, entitled "Generating Alert Notifications By Broadcasting Telematics Data To Nearby Mobile computing devices, Vehicles, And Infrastructure," filed Sep. 24, 2015, (7) U.S. Provisional Patent Application No. 62/232,050, entitled "Determining Abnormal Traffic Conditions From A Broadcast Of Telematics Data Originating From Another Vehicle," filed Sep. 24, 2015, (8) U.S. Provisional Patent Application No. 62/232,054, entitled "Taking Corrective Action Based Upon Telematics Data Broadcast From Another Vehicle," filed Sep. 24, 2015, (9) U.S. Provisional Patent Application No. 62/232,065, entitled "Analyzing Telematics Broadcast To Determine Travel Events And Corrective Actions," filed Sep. 24, 2015, (10) U.S. Provisional Patent Application No. 62/232,075, entitled "Providing Insurance Discounts Based Upon Usage Of Telematics Data-Based Risk Mitigation And Prevention Functionality," filed Sep. 24, 2015, (11) U.S. Provisional Patent Application No. 62/232,083, entitled "Determining Corrective Actions Based Upon Broadcast Of Telematics Data Originating From Another Vehicle," filed Sep. 24, 2015, (12) U.S. Provisional Patent Application No. 62/232,090, entitled "Determining Corrective Actions Based Upon Telematics Data Broadcast From Another Vehicle," filed Sep. 24, 2015, (13) U.S. Provisional Patent Application No. 62/232,097, entitled "Generating Alert Notifications By Broadcasting Train Telematics Data To Nearby Mobile computing devices, Vehicles, And Infrastructure," filed Sep. 24, 2015, (14) U.S. Provisional Patent Application No. 62/247,334, entitled "Generating Alert Notifications By Broadcasting Train Telematics Data To Nearby Mobile computing devices, Vehicles, And Infrastructure," filed Oct. 28, 2015, and (15) U.S. Provisional Patent Application No. 62/250,286, entitled "Generating Alert Notifications By Broadcasting Train Telematics Data To Nearby Mobile computing devices, Vehicles, And Infrastructure," filed Nov. 3, 2015. The disclosure of each of the aforementioned applications is hereby expressly incorporated by reference herein in its entirety.

FIELD OF THE DISCLOSURE

The present disclosure generally relates to telematics data and, more particularly, to using telematics data to reduce risk of accidents.

BACKGROUND

Conventional telematics devices may collect certain types of data that relate to operation of a vehicle. However, conventional telematics devices and data gathering techniques may have several drawbacks.

BRIEF SUMMARY

In one aspect, telematics data and/or geographic location data may be collected, monitored, measured, and/or generated by one or more computing devices associated with a vehicle. In another aspect, telematics data and/or geographic location data may be collected, monitored, measured, and/or generated by one or more computing devices associated with a train. The telematics data may include various metrics that indicate the direction, speed, and/or motion of the vehicle or train with which the data is associated. The geographic location data may include a geographic location of the vehicle or train, such as latitude and longitude coordinates, for example. The one or more computing devices may include a mobile computing device positioned within the vehicle or train, an on-board computer, a train controller (e.g., a smart train controller), and/or a combination of these devices working in conjunction with one another. The one or more computing devices may broadcast the telematics data and/or the geographic location data to one or more other devices.

The telematics data and/or the geographic location data may be received and/or processed by one or more other computing devices to determine whether an anomalous condition exists (e.g., whether a train is passing through, will pass through, or is within a predetermined distance of a railroad crossing such that travel of a vehicle through the railroad crossing is affected). These one or more other computing devices may be external computing devices (e.g., a remote server), another mobile computing device, an infrastructure component (e.g., a railroad crossing, which may be a "smart" railroad crossing as further discussed below), etc. If an anomalous condition is detected, the geographic location of the vehicle and/or train associated with the telematics data may be used as a condition to decide whether to generate an alert at (or send an alert notification to) one or more other computing devices associated with nearby vehicles.

In one aspect, a computer system configured to use train telematics data to reduce risk of accidents may be provided. A computer system may include at least one of one or more processors or associated transceivers mounted on or within an autonomous vehicle. The at least one of the one or more processors or the associated transceivers may be configured to: (1) receive, via wireless communication or data transmission, train telematics data associated with a train directly from a train transceiver or indirectly from a railroad crossing, the train telematics data including at least one of Global Positioning System (GPS) location, speed, route, heading, acceleration, or track data; (2) determine, based upon the train telematics data, (i) when, or a time period of when, the train will pass through or be passing through the railroad crossing or another railroad crossing, or (ii) when the train is within a predetermined distance of the railroad crossing or the other railroad crossing; (3) determine an alternate route for the autonomous vehicle to take to avoid waiting at the railroad crossing or the other railroad crossing to allow for the train to pass; and/or (4) direct the autonomous vehicle to one of (i) automatically travel along the alternate route, or (ii) automatically stop at the railroad crossing or the other railroad crossing to allow the train to pass unimpeded and to facilitate avoidance of train-vehicle collisions and safer train and vehicle travel. The at least one of the one or more processors or the associated transceivers may be configured to perform additional, fewer, or alternate actions, including those discussed elsewhere herein.

In another aspect, a computer-implemented method of using train telematics data to reduce risk of accidents may be provided. A method may include: (1) receiving, via at least one of one or more autonomous vehicle processors or associated transceivers via wireless communication or data transmission, the train telematics data associated with a train directly from a train transceiver or indirectly from a railroad crossing, the train telematics data including at least one of GPS location, speed, route, heading, acceleration, or track data; (2) determining, via the one or more autonomous vehicle processors based upon the train telematics data, (i) when, or a time period of when, the train will pass through or be passing through the railroad crossing or another railroad crossing, or (ii) when the train is within a predetermined distance of the railroad crossing or the other railroad crossing; (3) determining, via the one or more autonomous vehicle processors, an alternate route for the autonomous vehicle to take to avoid waiting at the railroad crossing or the other railroad crossing to allow for the train to pass; and/or (4) directing, via the one or more autonomous vehicle processors, the autonomous vehicle to one of (i) automatically travel along the alternate route, or (ii) automatically stop at the railroad crossing or the other railroad crossing to allow the train to pass unimpeded and to facilitate avoidance of train-vehicle collisions and safer train and vehicle travel. The method may include additional, fewer, or alternate actions, including those discussed elsewhere herein.

In yet another aspect, a system of using train telematics data to reduce risk of accidents may be provided. A system may include an autonomous vehicle with at least one of one or more processors or transceivers. The at least one of the one or more processors or the transceivers may be configured to: (1) receive the train telematics data associated with a train directly from a train transceiver or indirectly from a railroad crossing, the train telematics data including at least one of GPS location, speed, route, heading, acceleration, or track data; (2) determine when the train will pass through the railroad crossing or another railroad crossing based upon the train telematics data; and/or (3) determine an alternate route for the autonomous vehicle to take to avoid waiting at the railroad crossing or the other railroad crossing while the train is passing through to facilitate avoidance of train-vehicle collisions and safer vehicle and train travel. The at least one of the one or more processors or the transceivers may be configured to perform additional, fewer, or alternate actions, including those discussed elsewhere herein.

In another aspect, a computer-implemented method of using train telematics data to reduce risk of collisions may be provided. The method may include (1) generating, via one or more processors (such as a smart train controller) or a Telematics App, train telematics data associated with movement of a train, the train telematics data including GPS location, speed, route, heading, acceleration, and/or track data; (2) determining, via the one or more processors, when the train is within a predetermined distance of a railroad crossing based upon the train telematics data; and/or (3) when the train is determined to be within the predetermined distance of the railroad crossing and moving toward the railroad crossing, broadcasting via the one or more processors (such as via wireless communication or data transmission) an alert or the train telematics data (i) directly or indirectly to nearby autonomous vehicles to facilitate the autonomous vehicles avoiding or stopping at the railroad crossing, or (ii) directly or indirectly to smart railroad crossing infrastructure (e.g., a smart railroad crossing) to allow automatic gate closing or other visual alerts at the railroad crossing to avoid train-vehicle collisions.

In another aspect, a computer-implemented method of using train telematics data to reduce risk of collision may be provided. The method may include (1) generating, via one or more processors (such as a smart train controller) or a Telematics App, telematics data associated with movement of a train, the train telematics data including GPS location, speed, route, heading, acceleration, and/or track data; (2) determining, via the one or more processors, a time period of when the train will be passing through a railroad crossing based upon the train telematics data (such as based upon train GPS location, speed, heading, route, or track information, and/or comparison with a GPS location of the railroad crossing); and/or (3) when it is determined that the train is within the predetermined distance of the railroad crossing and moving toward the railroad crossing, broadcasting via the one or more processors (such as via wireless communication or data transmission): (a) the time period of when the train will be passing through the railroad crossing, (b) an alert, and/or (c) the train telematics data (i) directly or indirectly to autonomous vehicles to facilitate the autonomous vehicles automatically avoiding (such as re-routing themselves based upon a current destination and the train telematics data) and/or automatically stopping at the railroad crossing, or (ii) directly or indirectly to smart railroad crossing infrastructure to allow automatic gate closing or generation of other visual alerts at the smart railroad crossing to avoid train-vehicle collisions.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
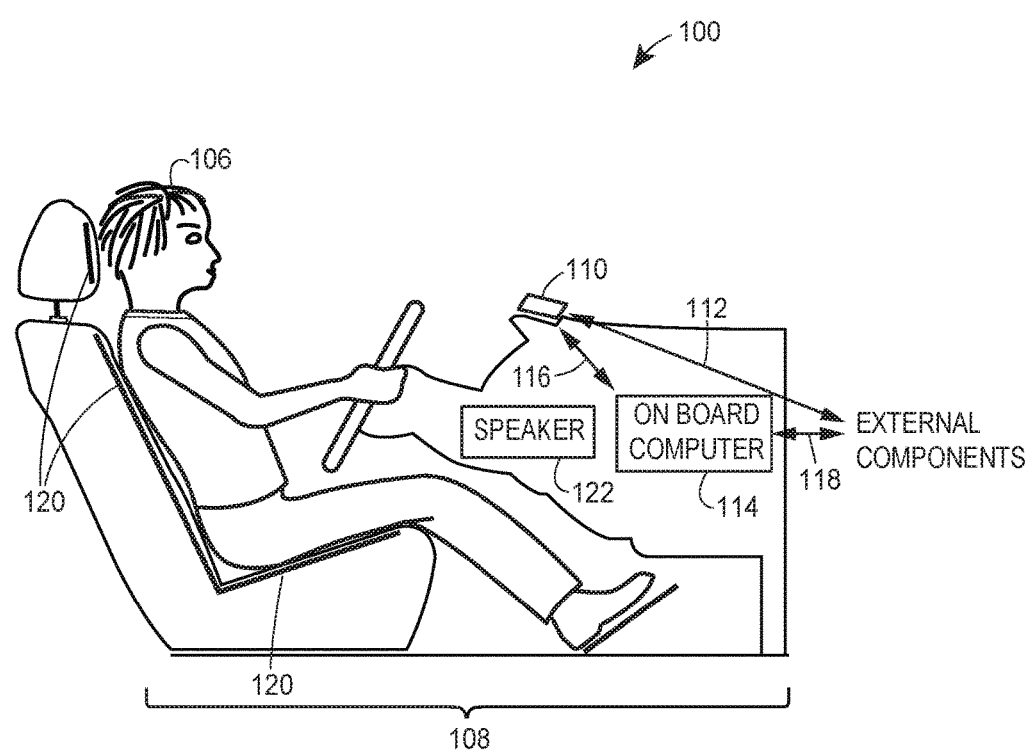
FIG. 1 illustrates a block diagram of an exemplary telematics collection system 100 in accordance with an exemplary aspect of the present disclosure.

The Figures depict preferred embodiments for purposes of illustration only. Alternative embodiments of the systems and methods illustrated herein may be employed without departing from the principles of the invention described herein.

DETAILED DESCRIPTION

The present embodiments relate to, inter alia, determining whether an anomalous condition associated with a train (e.g., that the train is passing through, will pass through, or is within a predetermined distance of a railroad crossing such that travel of a vehicle through the railroad crossing is affected) is detected at a location associated with a vehicle (e.g., a location of a railroad crossing for which travel of the vehicle therethrough is affected by the anomalous condition) using one or more computing devices within or otherwise associated with the vehicle. If the detected anomalous condition may impact or affect another vehicle on the road, embodiments are described to generate and/or send alert notifications to other vehicles that may be so affected. In some aspects, the vehicle and/or the other vehicles may be an autonomous vehicle(s). As further described throughout the disclosure, the process of detecting anomalous conditions and whether they apply to other vehicles may be performed through an analysis of geographic location data and/or telematics data broadcasted from one or more computing devices within or otherwise associated with one or more respective vehicles or the train.

The present embodiments may relate to collecting, transmitting, and/or receiving telematics data; and may include a mobile device, a vehicle-mounted processor, a train controller (e.g., a smart train controller), computer server, web pages, applications, software modules, user interfaces, interactive display screens, memory units, and/or other electronic, electrical, and/or wireless communication equipment configured to provide the functionality discussed herein. As compared with the prior art, the present embodiments include specifically configured computing equipment that provide for an enhanced method of collecting telematics and/or other vehicle/driving conditions related data, and performing certain actions based upon the data collected. Using the telematics and/or other data collected, in conjunction with the novel techniques discussed herein, recommendations and/or travel/driving guidance may be provided to remote vehicles and/or drivers.

The present embodiments may solve one or more technical problems related to (1) vehicle safety, and/or (2) vehicle navigation by using solutions or improvements in another technological field, namely telematics. Vehicle safety and vehicle navigation is often impacted by short-term traffic events that occur with little or no warning. For instance, vehicle accidents may be caused by road construction, other vehicle accidents, traffic being temporarily re-routed, unexpected bad weather, other drivers or vehicles, a train passing through a railroad crossing, etc.

To address these and other problems, telematics data (and/or driver behavior or vehicle information) may be captured in real-time, or near real-time, by a mobile device of a vehicle driver (or passenger) and/or a mobile device, train controller, etc. of a train. The mobile device and/or other device as described herein may be specifically configured for gathering, collecting, and/or generating telematics and/or other data as a vehicle and/or train is traveling.

For instance, the mobile device may be equipped with (i) various sensors and/or meters capable of generating telematics data (Global Positioning System (GPS) unit, speed sensor, speedometer, odometer, gyroscope, compass, accelerometer, etc.) and/or (ii) an application, such as a Telematics Data Application or Telematics "App," that includes computer instructions and/or software modules stored in a non-transitory memory unit that control collecting and generating telematics and/or other data. The mobile device and/or the application (or Telematics App) may provide a software module, user interface, and/or interactive display screen configured to facilitate the data collection. The mobile device and/or Telematics App executing thereon may be configured to prepare or otherwise format the telematics and/or other data collected or generated for transmission (via wireless communication and/or data transmission) to a mobile device of a second driver, a remote server, another (smart) vehicle, and/or an infrastructure component—all of which may be equipped with its own Telematics App or other telematics related applications. The Telematics App may include other functionality, including the mobile device functionality discussed elsewhere herein.

Alternatively, the mobile device may remotely access a web page, such as via wireless communication with a remote server. The web page may provide the mobile device with the functionality to collect the telematics and/or other data as the vehicle and/or train is moving. Additionally or alternatively, the web page may allow the mobile device to upload or transmit data in real-time, or near real-time, to a mobile device of a second driver, a remote server, an infrastructure component, and/or another (e.g., smart) vehicle.

Additionally or alternatively, a smart vehicle controller or processor and/or a smart train controller or processor may be configured with the same functionality as that of the mobile device described above. For instance, a smart vehicle and/or train controller may include an application, software module, or computer instructions that provide for the telematics and/or other data collection and generation functionality discussed herein. The smart vehicle and/or train controller may be in wired or wireless communication with various ("smart" or "dumb") vehicle-mounted and/or train-mounted meters, sensors, and/or detectors, such as speedometers, speed sensors, compasses, gyros, accelerometers, etc., that collect and/or generate telematics data and/or other data detailing or associated with vehicle and/or train operation, and/or driving or driver behavior.

In one aspect, by solving problems with collecting telematics data and/or other data associated with driver behavior, vehicle operation or performance, and/or train operation or performance, problems with vehicle navigation and/or vehicle operation may be resolved. For instance, telematics data associated with a first vehicle and/or a train may be collected in real-time by a mobile device of a first driver and/or a mobile device associated with the train. The mobile device(s) may be specifically configured to gather or generate telematics and/or other driver/vehicle/train data in real-time as the vehicle and/or train is traveling, such as via a Telematics App running on the mobile device. If a traffic event is encountered, about to be encountered, and/or expected or anticipated to be encountered by the vehicle as it travels (e.g., road construction; heavy traffic; congestion; bad weather conditions; unlawful, unexpected or erratic operation of other vehicles; questionable or abnormal driving behavior of other drivers; irresponsible or overly aggressive drivers; un-attentive or tired drivers; train passing through a railroad crossing, etc.), the telematics (and/or data) data collected may indicate such.

The mobile device itself (and/or Telematics App) may be configured to identify the type of traffic event and transmit the type of traffic event to other mobile devices, a remote server, smart vehicles, and/or an infrastructure component. In one embodiment, the mobile device (and/or Telematics App) may be in wireless communication with a smart vehicle control system of the vehicle and/or a smart train controller or control system of the train, and the smart vehicle control system and/or smart train controller or control system may transmit the telematics and/or other data, and/or any associated warnings, to a remote server, and/or roadside smart infrastructure or nearby mobile devices or vehicles of other drivers (such as to conserve battery power of the mobile device).

Alternatively, the mobile device (and/or Telematics App) may transmit the telematics and/or other data collected via wireless communication and/or data transmission to a second computing device—such as a second mobile device (of another driver), a second and smart vehicle, a remote server, and/or road side infrastructure (smart street signs or smart posts, smart toll booths, smart railroad crossings, etc.). After which, the second and remote computing device may analyze the telematics and/or other data that is collected in real-time, or near real-time, to determine traffic events in real-time, or near real-time, respectively. Based upon the type and extent of traffic event detected, the second computing device may issue warnings, determine recommendations, and/or re-route vehicles. For instance, the second computing device may cause a display screen or user interface of a mobile device or smart vehicle controller of remote drivers to display a map with (1) a current route that the vehicle is on, (2) a virtual representation of the traffic event, and/or (3) an alternate or recommended new route to an original destination that avoids the traffic event.

In one embodiment, a telematics application or software module (e.g., the Telematics App as discussed herein) may be designed to communicate with smart vehicles and smart infrastructure. An advantage of this is that for a vehicle owner that does not have a "smart" vehicle with wireless communication technology, the application and/or software module deployed on a smart phone or other mobile device may communicate with smart vehicles and infrastructure (and/or remote servers and other mobile devices). The telematics application and/or software module may be programmed to provide voice alerts: such as on a two lane road "do not pass-a vehicle is approaching" or "high speed vehicle is approaching to your left (or right);" "traffic light will turn in 10 seconds;" "turn left to find an open parking space;" "traffic is stopped 1.5 miles ahead;" "traffic has slowed to 20 mph 1.5 miles (or 2 blocks) ahead;" "recommended speed for turn ahead is 30 mph;" "ice on bridge (or ramp) ahead;" "train approaching railroad crossing;" "train approaching from East;" "train approaching in 10 seconds, stop at railroad crossing," etc.

As an example, a first mobile device may be traveling in a vehicle. The first mobile device may collect telematics data and/or other data, such as via a telematics application running on one or more processors mounted within the first mobile device. The first mobile device (and/or the telematics application) may detect a travel event from the data collected. For instance, the first mobile device (and/or the telematics application executing thereon) may determine that the vehicle is located on the highway, but the vehicle is moving slower than the posted speed limit; that both the vehicle and the train are approaching a railroad crossing, etc. The first mobile device (and/or the telematics application) may then transmit the data collected and/or an associated message via wireless communication or data transmission to smart roadside infrastructure and/or nearby vehicles (or a second mobile device traveling within a nearby and second vehicle).

The second mobile device (and/or a telematics application running thereon) may then, using the data received and/or message received from the first mobile device, generate an audible or visual warning or alert of the travel event, such as "Warning, congestion ahead," "Warning, train approaching ahead," "Train passing through railroad crossing for another 15 seconds," "Train passing through railroad crossing in 5 seconds," and/or "Recommend taking Exit 10 and traveling on Highway 12 for 5 miles until Exit 11 to avoid the congestion ahead." The second mobile device (and/or associated telematics application) may also be able to compare locations of the travel event with the current location of the second vehicle to determine if the travel event poses a potential obstacle to the second vehicle reaching its destination without interruption. Thus, the telematics data collected using a first mobile device (and/or a telematics application) and associated with a first driver may be used to alert a second driver (associated with the second mobile device) of a travel event and/or re-route the second vehicle to facilitate safer vehicle travel for the second driver and vehicle.

In one aspect, a mobile device (and/or the telematics application) may compare a vehicle's traveling speed with a known posted speed limit. If the vehicle's speed is below or above the posted speed by a certain threshold, for example, 10 or 20 miles-per-hour, then the mobile device may generate a warning and transmit the warning to roadside infrastructure and/or nearby mobile devices or vehicles. For example, the message may state "Slow moving vehicle in right hand lane ahead;" "High speed vehicle approaching from rear;" And/or "High speed vehicle approaching from ahead."

Other messages or alerts that may be generated from mobile devices (and/or telematics applications executing thereon), smart vehicle controllers, smart train controllers, remote servers, and/or smart infrastructure and transmitted to a mobile device of a driver (and/or smart vehicle) may include "Construction 1 mile ahead;" "Rain (or Snow) 5 miles ahead;" "Detour 2 blocks ahead;" "Traffic light directly ahead will change from Green to Red starting in 5 seconds;" "Stranded vehicle on right side of road half a mile ahead;" "Recommend turning right at next intersection to avoid travel event 3 blocks ahead;" "Train approaching ahead, stop at railroad crossing;" and/or other travel or traffic event-related messages.

An insurance provider may collect data indicative of an insured's having of and/or usage of the vehicle safety functionality provided herein (e.g., functionality associated with receiving a wireless communication broadcast including train telematics data, analyzing the train telematics data, and directing corrective actions based upon the train telematics data, as further discussed below). For instance, such data may be collected at an insurance provider remote server and/or via a mobile device application. Based upon an individual's usage and/or taking travel recommendations, such as travel recommendations that reduce or lower risk and/or enhance driver or vehicle safety, insurance policies (such as vehicle or life insurance policies) may be adjusted, generated, and/or updated. The insurance provider remote server may calculate, update, and/or adjust insurance premiums, rates, discounts, points, programs, etc., such as adjusting an insurance discount or premium based upon the insured having the functionality discussed herein and/or the amount that the insured uses the functionality discussed herein. The updated insurance policies (and/or premiums, rates, discounts, etc.) may be communicated to insurance customers for their review, modification, and/or approval—such as via wireless communication or data transmission from a remote server to a mobile device of the insured (e.g., for display on a mobile device of the insured).

Telematics and Vehicle Navigation

In one aspect, by solving problems with collecting telematics data and/or other data associated with driver behavior, vehicle operation or performance, and/or train operation or performance, problems with vehicle navigation and/or vehicle operation may be resolved. For instance, telematics data associated with a first vehicle and/or a train may be collected in real-time by a mobile device of a first driver and/or a mobile device associated with the train. The mobile device(s) may be specifically configured to gather or generate telematics and/or other driver/vehicle/train data in real-time as the vehicle and/or train is traveling. If a traffic event is encountered, about to be encountered, and/or expected or anticipated to be encountered by the vehicle as it travels (e.g., road construction; heavy traffic; congestion; bad weather conditions; unlawful, unexpected or erratic operation of other vehicles; questionable or abnormal driving behavior of other drivers; irresponsible or overly aggressive drivers; un-attentive or tired drivers; train passing through a railroad crossing, etc.), the telematics (and/or data) data collected may indicate such.

The mobile device itself may be configured to identify the type of traffic event and transmit the type of traffic event to other mobile devices, a remote server, smart vehicles, and/or an infrastructure component. In one embodiment, the mobile device may be in wireless communication with a smart vehicle control system of the vehicle and/or a smart train controller or control system of the train, and the smart vehicle control system and/or smart train controller or control system may transmit the telematics and/or other data, and/or any associated warnings, to a remote server, and/or roadside smart infrastructure or nearby mobile devices or vehicles of other drivers (such as to conserve battery power of the mobile device).

Additionally or alternatively, the mobile device may transmit the telematics and/or other data collected via wireless communication and/or data transmission to a second computing device—such as a second mobile device (of another driver), a second and smart vehicle, a remote server, and/or road side infrastructure (smart street signs or road posts, smart toll booths, smart railroad crossings, etc.). After which, the second and remote computing device may analyze the telematics and/or other data that is collected in real-time, or near real-time, to determine traffic events in real-time, or near real-time, respectively. Based upon the type and extent of traffic event detected, the second computing device may issue warnings, determine recommendations, and/or re-route vehicles. For instance, the second computing device may cause a display screen or user interface of a mobile device or smart vehicle controller of remote drivers to display a map with (1) a current route that the vehicle is on, (2) a virtual representation of the traffic event, and/or (3) an alternate or recommended new route to an original destination that avoids the traffic event.

Exemplary Telematics Collection System

FIG. 1 illustrates a block diagram of an exemplary telematics collection system 100 in accordance with an exemplary aspect of the present disclosure. In some aspects, telematics collection system 100 may include hardware and software applications configured to measure, calculate, generate, and/or collect geographic location data and/or telematics data indicative of the speed, direction, and/or motion of vehicle 108. Additionally or alternatively, telematics collection system 100 may include hardware and software applications configured to receive and process geographic location data and/or telematics data sent from another telematics collection system, to determine whether an anomalous condition has been detected, whether to generate an alert, and/or whether to send an alert notification. Telematics collection system 100 may include various data communication channels for facilitating data communications between the various hardware and software components and/or communications with one or more external components.

In some aspects, telematics collection (e.g., one or more features of telematics collection system 100) may additionally or alternatively be implemented with respect to a train, such as train 210 discussed below with respect to FIG. 2. Thus, a train may include any one or more suitable features of telematics collection system 100 as described herein with respect to vehicle 108 so as to, for example, measure, calculate, generate, and/or collect geographic location data and/or telematics data indicative of speed, direction, and/or motion of the train.

Telematics collection system 100 may include any suitable number of computing devices, such as mobile computing device 110 and/or on-board computing device 114, for example. These computing devices may be disposed within vehicle 108, permanently installed in vehicle 108, or removably installed in vehicle 108.

In the present aspects, mobile computing device 110 may be implemented as any suitable computing or mobile device, such as a mobile device (e.g., smartphone, tablet, laptop, wearable electronics, phablet, pager, personal digital assistant (PDA), smart glasses, smart watch or bracelet, etc.), while on-board computer 114 may be implemented as a general-use on-board computer or processor(s) installed by the manufacturer of vehicle 108 or as an aftermarket modification to vehicle 108, for example. In various aspects, mobile computing device 110 and/or on-board computer 114 may be a thin-client device configured to outsource any suitable portion of processing via communications with one or more external components.

On-board computer 114 may supplement one or more functions performed by mobile computing device 110 described herein by, for example, sending information to and/or receiving information from mobile computing device 110. Mobile computing device 110 and/or on-board computer 114 may communicate with one or more external components via links 112 and 118, respectively. Additionally, mobile computing device 110 and on-board computer 114 may communicate with one another directly via link 116.

In one aspect, mobile computing device 110 may be configured with suitable hardware and/or software (e.g., one or more applications, programs, files, etc.) to determine a geographic location of mobile computing device 110 and, hence, vehicle 108, in which it is positioned. Additionally or alternatively, mobile computing device 110 may be configured with suitable hardware and/or software to monitor, measure, generate, and/or collect one or more sensor metrics as part of the telematics data. Mobile computing device 110 may be configured to broadcast the geographic location data and/or the one or more sensor metrics to one or more external components.

In some aspects, the external components may include another mobile computing device substantially similar to or identical to mobile computing device 110. In accordance with such aspects, mobile computing device 110 may additionally or alternatively be configured to receive geographic location data and/or sensor metrics broadcasted from another mobile computing device, the details of which are further discussed below. Mobile computing device 110 may be configured to determine, upon receiving the geographic location data and/or sensor metrics, whether an anomalous condition exists at the geographic location indicated by the geographic location data. If so, mobile computing device 110 may be configured to generate one or more audio and/or video alerts indicative of the determined anomalous condition.

On-board computer 114 may be configured to perform one or more functions otherwise performed by mobile computing device 110. However, on-board computer 114 may additionally be configured to obtain geographic location data and/or telematics data by communicating with one or more vehicle sensors that are integrated into vehicle 108. For example, on-board computer 114 may obtain geographic location data via communication with a vehicle-integrated global navigation satellite system (GNSS). To provide additional examples, on-board computer 114 may obtain one or more metrics related to the speed, direction, and/or motion of vehicle 108 via any number of suitable sensors, such as speedometer sensors, braking sensors, airbag deployment sensors, crash detection sensors, etc.

In one aspect, mobile computing device 110 and/or on-board computer 114 may operate independently of one another to generate geographic location data and/or telematics data, to receive geographic location data and/or telematics data broadcasted from another telematics collection system, to determine whether to generate one or more alerts, and/or to generate one or more alert notifications. In accordance with such aspects, telematics collection system 100 may include mobile computing device 110 but not on-board computer 114, and vice-versa.

In other aspects, mobile computing device 110 and/or on-board computer 114 may operate in conjunction with one another to generate geographic location data and/or telematics data, to receive geographic location data and/or telematics data broadcasted from another telematics collection system, to determine whether to generate one or more alerts, and to generate one or more alert notifications. In accordance with such aspects, telematics collection system 100 may include both mobile computing device 110 and on-board computer 114. Mobile computing device 110 and on-board computer 114 may share any suitable portion of processing between one another to facilitate the functionality described herein.

Upon receiving notification alerts from another telematics collection system, aspects include telematics collection system 100 generating alerts via any suitable audio, video, and/or tactile techniques. For example, alerts may be generated via a display implemented by mobile computing device 110 and/or on-board computer 114. To provide another example, a tactile alert system 120 (e.g., a seat that can vibrate) may be configured to generate tactile alerts to a vehicle operator 106 when commanded by mobile computing device 110 and/or on-board computer 114. To provide another example, audible alerts may be generated via a speaker 122, which may be part of vehicle 108's integrated speaker system, for example.

Although telematics collection system 100 is shown in FIG. 1 as including one mobile computing device 110 and one on-board computer 114, various aspects include telematics collection system 100 implementing any suitable number of mobile computing devices 110 and/or on-board computers 114.

Exemplary Telematics Alert Notification System

Figure 2:
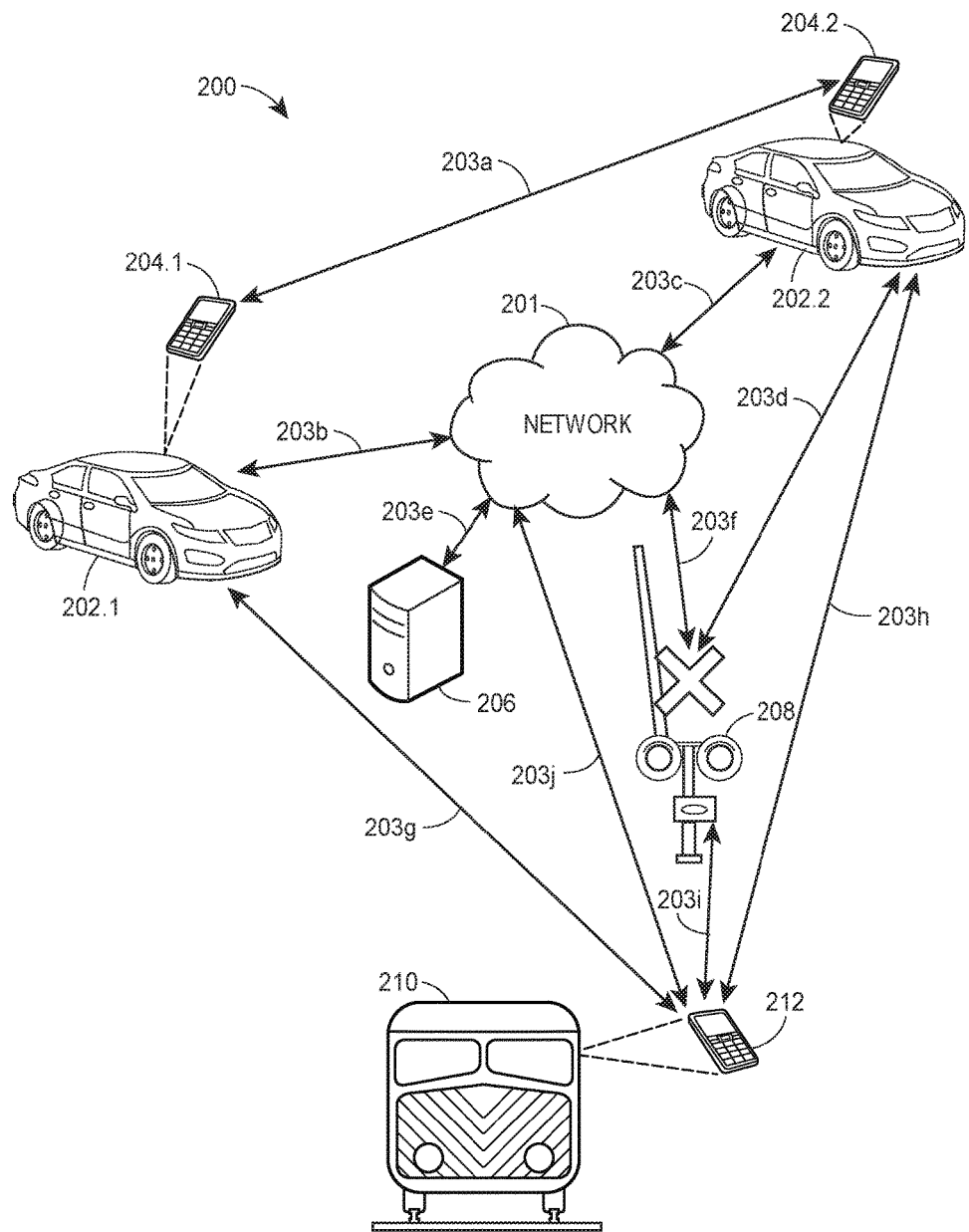
FIG. 2 illustrates a block diagram of an exemplary alert notification system 200 in accordance with an exemplary aspect of the present disclosure.

FIG. 2 illustrates a block diagram of an exemplary alert notification system 200 in accordance with an exemplary aspect of the present disclosure. In one aspect, alert notification system 200 may include a network 201, N number of vehicles 202.1-202.N and respective mobile computing devices 204.1-204.N, an external computing device 206, an infrastructure component 208, and/or a train 210. In one aspect, mobile computing devices 204 may be an implementation of mobile computing device 110, as shown in FIG. 1, while vehicles 202 may be an implementation of vehicle 108, also shown in FIG. 1. Each of vehicles 202.1 and 202.2 may have an associated on-board computer, which is not shown in FIG. 2 for purposes of brevity, but may be an implementation of on-board computer 114, as shown in FIG. 1. Additionally or alternatively, the train 210 may have an associated mobile computing device 212 (e.g., within train 210), which may be an implementation of mobile computing device 110, and/or an associated on-board computer (not shown in FIG. 2), which may be an implementation of on-board computer 114. Each of vehicles 202.1 and 202.2 may be configured for wireless inter-vehicle communication and/or communication with one or more of mobile computing devices 204.1-204.N, external computing device 206, infrastructure component 208, train 210, and/or mobile computing device 212. Aspects include each of vehicles 202.1 and 202.2 being configured to perform communications in any suitable manner, such as via vehicle-to-vehicle (V2V) wireless communication and/or other suitable data transmission.

Although alert notification system 200 is shown in FIG. 2 as including one network 201, two mobile computing devices 204.1 and 204.2, two vehicles 202.1 and 202.2, one external computing device 206, one infrastructure component 208, one train 210, and/or one mobile computing device 212, various aspects include alert notification system 200 implementing any suitable number of networks 201, mobile computing devices 204, vehicles 202, external computing devices 206, infrastructure components 208, trains 210, and/or mobile computing devices 212. For example, alert notification system 200 may include a plurality of external computing devices 206 and more than two mobile computing devices 204, any suitable number of which being interconnected directly to one another and/or via network 201.

In one aspect, each of mobile computing devices 204.1, 204.2, and 212 may be configured to communicate with one another and/or any suitable device directly via peer-to-peer (P2P) wireless communication and/or data transfer. In other aspects, each of mobile computing devices 204.1, 204.2, and 212 may be configured to communicate indirectly with one another and/or any suitable device via communications over network 201, such as external computing device 206, infrastructure component 208, and/or train 210, for example. In still other aspects, each of mobile computing devices 204.1, 204.2, and 212 may be configured to communicate directly and indirectly with one another and/or any suitable device, which may be via concurrent communications or communications occurring at separate times.

Each of mobile computing devices 204.1, 204.2, and 212 may be configured to send data to and/or receive data from one another and/or via network 201 using one or more suitable communication protocols, which may be the same communication protocols or different communication protocols as one another. To provide an example, mobile computing devices 204.1 and 204.2 may be configured to communicate with one another via a direct radio link 203a, which may utilize, for example, a Wi-Fi direct protocol, an ad-hoc cellular communication protocol, etc. Furthermore, mobile computing devices 204.1 and 204.2 may be configured to communicate with the vehicle on-board computers located in vehicles 202.1 and 202.2, respectively, utilizing a BLUETOOTH communication protocol (radio link not shown).

To provide additional examples, mobile computing devices 204.1 and 204.2 may be configured to communicate with one another via radio links 203b and 203c by each communicating with network 201 utilizing a cellular communication protocol. As an additional example, mobile computing devices 204.1 and/or 204.2 may be configured to communicate with external computing device 206 via radio links 203b, 203c, and/or 203e. Still further, one or more of mobile computing devices 204.1 and/or 204.2 may also be configured to communicate with one or more smart infrastructure components 208 directly (e.g., via radio link 203d) and/or indirectly (e.g., via radio links 203c and 203f via network 201) using any suitable communication protocols.

To provide still further examples, mobile computing device 212 may be configured to communicate with mobile computing device 204.1 via a direct radio link 203g; mobile computing device 212 may be configured to communicate with mobile computing device 204.2 via a direct radio link 203h; mobile computing device 212 may be configured to communicate with infrastructure component 208 via a direct radio link 203i; and mobile computing device 212 may be configured to communicate with network 201 via a radio link 203j so as to allow mobile computing device 212 to communicate indirectly with any suitable component in communication with network 201.

Mobile computing devices 204.1, 204.2, and 212 may be configured to execute one or more algorithms, programs, applications, etc., to determine a geographic location of each respective mobile computing device (and thus their associated vehicle or train) to generate, measure, monitor, and/or collect one or more sensor metrics as telematics data, to broadcast the geographic data and/or telematics data via their respective radio links, to receive the geographic data and/or telematics data via their respective radio links, to determine whether an alert should be generated based upon the telematics data and/or the geographic location data, to generate the one or more alerts, and/or to broadcast one or more alert notifications.

Network 201 may be implemented as any suitable network configured to facilitate communications between mobile computing devices 204.1, 204.2, and/or 212 and one or more of external computing device 206, smart infrastructure component 208, or train 210. For example, network 201 may include one or more telecommunication networks, nodes, and/or links used to facilitate data exchanges between one or more devices, and may facilitate a connection to the Internet for devices configured to communicate with network 201. Network 201 may include any suitable number of interconnected network components that form an aggregate network system, such as dedicated access lines, plain ordinary telephone lines, satellite links, cellular base stations, a public switched telephone network (PSTN), etc., or any suitable combination thereof. Network 201 may include, for example, a proprietary network, a secure electronic communication network, a secure public internet, a mobile-based network, a virtual private network, etc.

In aspects in which network 201 facilitates a connection to the Internet, data communications may take place over the network 201 via one or more suitable Internet communication protocols. For example, network 201 may be implemented as a wireless telephony network (e.g., GSM, CDMA, LTE, etc.), a Wi-Fi network (e.g., via one or more IEEE 802.11 Standards), a WiMAX network, a Bluetooth network, etc. Thus, links 203a-203j may represent wired links, wireless links, or any suitable combination thereof.

In aspects in which mobile computing devices 204.1, 204.2, and 212 communicate directly with one another in a peer-to-peer fashion, network 201 may be bypassed and thus communications between mobile computing devices 204.1, 204.2, and 212 and external computing device 206 may be unnecessary. For example, in some aspects, mobile computing device 204.1 or mobile computing device 212 may broadcast geographic location data and/or telematics data directly to mobile computing device 204.2. In this case, mobile computing device 204.2 may operate independently of network 201 to determine whether an alert should be generated at mobile computing device 204.2 based upon the geographic location data and the telematics data. In accordance with such aspects, network 201 and external computing device 206 may be omitted.

However, in other aspects, one or more of mobile computing devices 204.1, 204.2, and/or 212 may work in conjunction with external computing device 206 to generate alerts. For example, in some aspects, mobile computing device 204.1 or mobile computing device 212 may broadcast geographic location data and/or telematics data, which is received by external computing device 206. In this case, external computing device 206 may be configured to determine whether an alert should be sent to mobile computing device 204.2 based upon the geographic location data and the telematics data.

To provide an example, mobile computing device 204.1 or mobile computing device 212 may broadcast telematics data, which is received by mobile computing device 204.2 and/or vehicle 202.2. Upon receipt of the telematics data, mobile computing device 204.2 and/or vehicle 202.2 may determine that an abnormal traffic condition (e.g., train passing or will be passing through a railroad crossing (e.g., an implementation of infrastructure component 208)) exists at the location of the originating vehicle (e.g., the location of mobile computing device 212 and train 210) and/or whether this location is along a route travelled by vehicle 202.2 or is otherwise relevant to vehicle 202.2.

Once this is determined, mobile computing device 204.2 and/or vehicle 202.2 may automatically take a preventive or corrective action, which may include, for example, mobile computing device 204.2 and/or vehicle 202.2 generating or determining an alert, issuing a visual alert, providing an audio or audible alert, identifying an alternate travel route that avoids the location of the abnormal traffic condition, presenting an alternative travel route on a display or display screen for use by a driver of vehicle 202.2, providing audio driving directions for the driver of vehicle 202.2 to travel along the alternate route, etc.

External computing device 206 may be configured to execute various software applications, algorithms, and/or other suitable programs. External computing device 206 may be implemented as any suitable type of device to facilitate the functionality as described herein. For example, external computing device 206 may be implemented as a network server, a web-server, a database server, one or more databases and/or storage devices, a central monitoring system and/or dispatching center computer used by emergency response personnel, a railway monitoring system, or any suitable combination thereof. Although illustrated as a single device in FIG. 2, one or more portions of external computing device 206 may be implemented as one or more storage devices that are physically co-located with external computing device 206, or as one or more storage devices utilizing different storage locations as a shared database structure (e.g. cloud storage).

In some embodiments, external computing device 206 may be configured to perform any suitable portion of the processing functions remotely that have been outsourced by one or more of mobile computing devices 204.1, 204.2, and/or 212. For example, mobile computing device 204.1, 204.2, and/or 212 may collect data (e.g., geographic location data and/or telematics data) as described herein, but may send the data to external computing device 206 for remote processing instead of processing the data locally. In such embodiments, external computing device 206 may receive and process the data to determine whether an anomalous condition exists and, if so, whether to send an alert notification to, for example, one or more of mobile computing devices 204.1 and/or 204.2.

In one aspect, external computing device 206 may additionally or alternatively be part of an insurer computing system (or facilitate communications with an insurer computer system), and as such may access insurer databases, execute algorithms, execute applications, access remote servers, communicate with remote processors, etc., as needed to perform insurance-related functions. For example, external computing device 206 may facilitate the receipt of telematics data or other data from one or more mobile computing devices 204.1-204.N, which may be associated with insurance customers and/or running a Telematics App, as further discussed below with reference to FIG. 3.

In aspects in which external computing device 206 facilitates communications with an insurer computing system (or is part of such a system), data received from one or more mobile computing devices 204.1-204.N may include logon credentials which may be verified by external computing device 206 or one or more other external computing devices, servers, etc. These logon credentials may be associated with an insurer profile, which may include, for example, insurance policy numbers, a description and/or listing of insured assets, vehicle identification numbers of insured vehicles, addresses of insured structures, contact information, premium rates, discounts, etc.

In this way, data received from one or more mobile computing devices 204.1-204.N may allow external computing device 206 to uniquely identify each insured customer and/or whether each identified insurance customer has installed the Telematics App. Furthermore, any data collected from one or more mobile computing devices 204.1-204.N may be referenced to each insurance customer and/or any insurance policies associated with each insurance customer for various insurance-related purposes.

For example, as further discussed below with reference to FIG. 3, the one or more mobile computing devices 204.1-204.N may broadcast, in addition to or as part of the telematics data, data indicative of whether a Telematics App has been installed and/or usage data indicative of how often a driver uses the Telematics App functionality while driving. Of course, similar or identical data may be received from a vehicle as opposed to the mobile computing device located in the vehicle. That is, the same functions discussed below with reference to FIG. 3 regarding the Telematics App installed and executed on a mobile computing device may also (or alternatively) be installed and executed as part of a vehicle's integrated computer functions, as previously discussed with reference to FIG. 1 above.

In various aspects, an insurer may leverage data regarding whether an insured customer has installed a Telematics App or how often the Telematics App is used while driving to calculate, adjust, and/or update various insurance pricing for an automotive insurance policy or other suitable insurance policy. For example, as noted above, an insurer may adjust insurance premiums, rates, discounts, points, programs, etc., based upon the insured having the functionality discussed herein and/or the amount that the insured uses the functionality discussed herein.

In addition, external computing device 206 may facilitate the communication of the updated insurance policies, premiums, rates, discounts, etc., to insurance customers for their review, modification, and/or approval—such as via wireless communication or data transmission to one or more mobile computing devices 204.1-204.N. For example, an insurer may provide an initial discount for an insured customer installing the Telematics App and logging in with the Telematics App. To continue this example, because the alert notifications provided by the Telematics App may reduce the likelihood of a collision or other damage occurring to the vehicle or the driver, use of the Telematics App may function to mitigate or prevent driving risks upon which an insurance policy is partially based. Therefore, an insurer may provide an additional discount that increases with the insured customer's usage of the Telematics App while driving.

In some aspects, external computing device 206 may facilitate indirect communications between one or more of mobile computing devices 204.1-204.2, vehicles 202.1-202.N, infrastructure component 208, train 210, and/or mobile computing device 212 via network 201 or another suitable communication network and/or wireless link. For example, external computing device 206 may receive telematics data from an originating mobile computing device 204.1 via radio link 203b and relay the telematics data to a destination mobile computing device 204.2 and/or to vehicle 202.2 via radio link 203c.

With respect to FIG. 2, infrastructure component 208 may be implemented as any suitable type of traffic infrastructure component configured to receive communications from and/ or to send communications to other devices, such as mobile computing devices 204.1, 204.2, and/or 212, and/or external computing device 206, for example.

In some aspects, as noted herein, infrastructure component 208 may be implemented as one or more "smart" infrastructure components, which may be configured to communicate with one or more other devices directly and/or indirectly.

For example, smart infrastructure component 208 may be configured to communicate with one or more devices directly and/or indirectly. For example, smart infrastructure component 208 may be configured to communicate directly with mobile computing device 204.2 via link 203.d and/or with mobile computing device 204.1 via links 203b and 203f utilizing network 201. To provide another example, smart infrastructure component 208 may communicate with external computing device 206 via links 203e and 203f utilizing network 201.

Smart infrastructure component 208 may be implemented as any suitable type of traffic infrastructure component configured to receive communications from and/or to send communications to other devices, such as mobile computing devices 204.1, 204.2, and/or 212, and/or external computing device 206, for example. For example, smart infrastructure component 208 may be implemented as a traffic light, a railroad crossing light, a construction notification sign, a roadside display configured to display messages, a billboard display, etc.

Similar to external computing device 206, one or more smart infrastructure components 208 may facilitate indirect communications between one or more of mobile computing devices 204.1-204.2, vehicles 202.1-202.N, external computing device 206, train 210, and/or mobile computing device 212 via network 201 or another suitable communication network and/or wireless link. For example, one or more smart infrastructure components 208 may receive telematics data from an originating mobile computing device 204.2 via radio link 203d and relay the telematics data to a destination mobile computing device 204.1 and/or to vehicle 202.1 via radio links 203b and 203f.

When implemented as a railroad crossing, smart infrastructure component 208 may be configured to detect when a train (e.g., train 210) is approaching a railroad crossing in any suitable manner. For example, a traditional railroad crossing may cause a signal to be sounded, lights to flash, gates to close, etc., upon an oncoming train approaching and triggering a switch. Aspects include smart infrastructure component 208, however, detecting a train approaching from a distance that is further from the railroad crossing that would be detected by a typical railroad switching system. This may be accomplished, for example, via the receipt, processing, and/or analysis of train telematics data that is transmitted by a mobile device located in or otherwise associated with a train and/or a dedicated device that is located in or otherwise associated with the train.

As explained above with respect to the telematics data corresponding to a vehicle, train telematics data may include metrics that indicate, for example, the train's current geographic location, speed, heading, motion, etc. In various aspects, the train telematics data may be collected by a dedicated device located on the train and/or a mobile device located on the train, similar to the telematics collection process discussed herein with respect to the vehicle telematics data collected via mobile computing devices 204.1-204.N.

To provide a more particular example, in one aspect, the train telematics data may include at least one of a timestamp, one or more sensor metrics indicative of braking motion of train 210, one or more sensor metrics indicative of acceleration motion of train 210, one or more sensor metrics indicative of cornering motion of train 210, or one or more sensor metrics indicative of a direction of train 210.

In another aspect, the train telematics data may additionally or alternatively include at least one of speed, acceleration, deceleration, GPS (Global Positioning System) coordinates (at times referred to herein as "GPS location"), or lane data associated with train 210. In yet another aspect, the train telematics data may additionally or alternatively include at least one of time, braking, acceleration, left turn, right turn, heading, GPS speed, GPS latitude and longitude, gyroscope, battery level, or telephone usage data associated with train 210. It should be appreciated that some of the train telematics data associated with train 210 may be associated with train 210 but be data that is collected and/or gathered from one or more other devices and/or vehicles. For instance, telephone usage data associated with train 210 may be telephone usage data of a mobile computing device in a vehicle, such as telephone usage data of mobile computing device 204.1 in vehicle 202.1.

In some aspects, the train telematics data may also include information relevant to applications involving trains. For example, the train telematics data may include a train number or other identifier, the type of train (e.g., passenger vs. freight), a number of cars, an overall train length (which may be updated as additional cars are removed and added via data received from external computing device 206 and/or user interaction), an estimated time in which the train should reach a railroad crossing, an estimated time that it will take the train to pass through a railroad crossing, etc.

In some aspects, smart infrastructure component 208 may be configured to receive geographic location data and/or telematics data from one or more other devices and to process this data to determine whether an anomalous condition has been detected and whether the detected anomalous condition satisfies a threshold distance condition with respect to smart infrastructure component 208. The threshold distance condition may include, for example, the geographic location of the anomalous condition being within a threshold radius of smart infrastructure component 208, on the same road serviced by smart infrastructure component 208, etc. If so, smart infrastructure component 208 may perform one or more relevant actions such as displaying one or more relevant messages to notify drivers in the vicinity, to modify traffic patterns, to change traffic light timing, to redirect traffic, etc.

In other aspects, smart infrastructure component 208 may receive data indicating that an alert is to be generated and/or the type of alert that is to be generated. In accordance with such aspects, one or more of mobile computing devices 204.1, 204.2 and/or external computing device 206, for example, may make the determination of whether an anomalous condition exists and is within a threshold distance of smart infrastructure component 208. If so, the data received by smart infrastructure component 208 may be indicative of the type of anomalous condition, the location of the anomalous condition, commands to cause smart infrastructure component 208 to perform one or more acts, the type of acts to perform, etc.

To provide some illustrative examples, a train (e.g., train 210) may broadcast one or more signals indicating that the train is approaching a railroad crossing, which may be received by one or more of mobile computing devices 204.1-204.2 and/or smart infrastructure component 208 and may result in the mobile computing devices generating one or more alert notifications and/or smart infrastructure component 208 changing to a different state. The broadcasted signal may be transmitted upon the train approaching (e.g., within a threshold distance of) the crossing location, and may be transmitted from a mobile device (e.g., mobile computing device 212) and/or equipment mounted on or otherwise associated with the train.

To provide another example, if smart infrastructure component 208 is implemented as a smart traffic light, smart infrastructure component 208 may change a traffic light from green to red (or vice-versa) or adjust a timing cycle to favor traffic in one direction over another. To provide yet another example, if smart infrastructure component 208 is implemented as a traffic sign display, smart infrastructure component 208 may display a warning message that the anomalous condition (e.g., a traffic accident) has been detected ahead and/or on a specific road corresponding to the geographic location data.

In additional aspects, other vehicles may play a role in the one or more alert notifications. To provide an illustrative example, an emergency vehicle (e.g., an ambulance, fire truck, etc.) may be dispatched to the scene of an accident. In such a case, the emergency vehicle may be configured to broadcast one or more signals that cause one or more of mobile computing devices 204.1-204.2 to generate one or more alert notifications and/or smart infrastructure component 208 to change to a different state. These signals may be broadcasted from a mobile computing device carried by emergency response personnel and triggered upon the vehicle approaching (e.g., within a threshold distance) a geographic location associated the vehicle accident. Additionally or alternatively, the signals may be broadcasted by any suitable device mounted in or otherwise associated with the emergency response vehicle.

To provide another illustrative example, a train may broadcast one or more signals indicating that the train is approaching a railroad crossing, which is received by one or more of mobile computing devices 204.1-204.2 and/or infrastructure component 208 and results in the mobile computing devices generating one or more alert notifications and/or the infrastructure component 208 changing to a different state. Similar to the emergency vehicle example above, the broadcasted signal may be transmitted upon the train approaching (e.g., within a threshold distance) of the crossing location, and may be transmitted from a mobile computing device and/or equipment mounted on or otherwise associated with the train.

To provide another illustrative example, a train may broadcast one or more signals indicating that the train is approaching a railroad crossing, which is received by one or more of mobile computing devices 204.1-204.2 and/or infrastructure component 208 and results in the mobile computing devices generating one or more alert notifications and/or the infrastructure component 208 changing to a different state. Similar to the emergency vehicle example above, the broadcasted signal may be transmitted upon the train approaching (e.g., within a threshold distance) of the crossing location, and may be transmitted from a mobile computing device and/or equipment mounted on or otherwise associated with the train.

The signals transmitted from train 210 and/or additional vehicles such as emergency response vehicles (emergency response vehicles not being illustrated in FIG. 2 for purposes of brevity) may be transmitted in accordance with any suitable communication protocol directly and/or indirectly to one or more or mobile computing devices 204.1-204.2 and/or smart infrastructure component 208, for example. For example, the signals may be transmitted directly to smart infrastructure component 208, indirectly to one or more of mobile computing devices 204.1-204.2 via network 201 and/or external computing device 206, etc.

Exemplary End-User/Destination Devices

The following details regarding the determination of an anomalous condition are explained in this section with reference to computing device 300, which may be a mobile computing device or "mobile device" (e.g., smart phone, laptop, tablet, phablet, smart watch, wearable electronics, etc.). In the present aspect, computing device 300 may be implemented as any suitable computing device, such as a mobile computing device (e.g., mobile computing device 110, as shown in FIG. 1). In another aspect, computing device 300 may be implemented as an on-board vehicle computer (e.g., on-board vehicle computer 114, as shown in FIG. 1). In still other aspects, computing device 300 may be implemented as a device external to a vehicle (e.g., external computing device 206 or smart infrastructure component 208, as shown in FIG. 2).

Depending upon the implementation of computing device 300, the methods and processes utilized to determine the existence of anomalous conditions may be performed locally, remotely, or any suitable combination of local and remote processing techniques.

Figure 3:
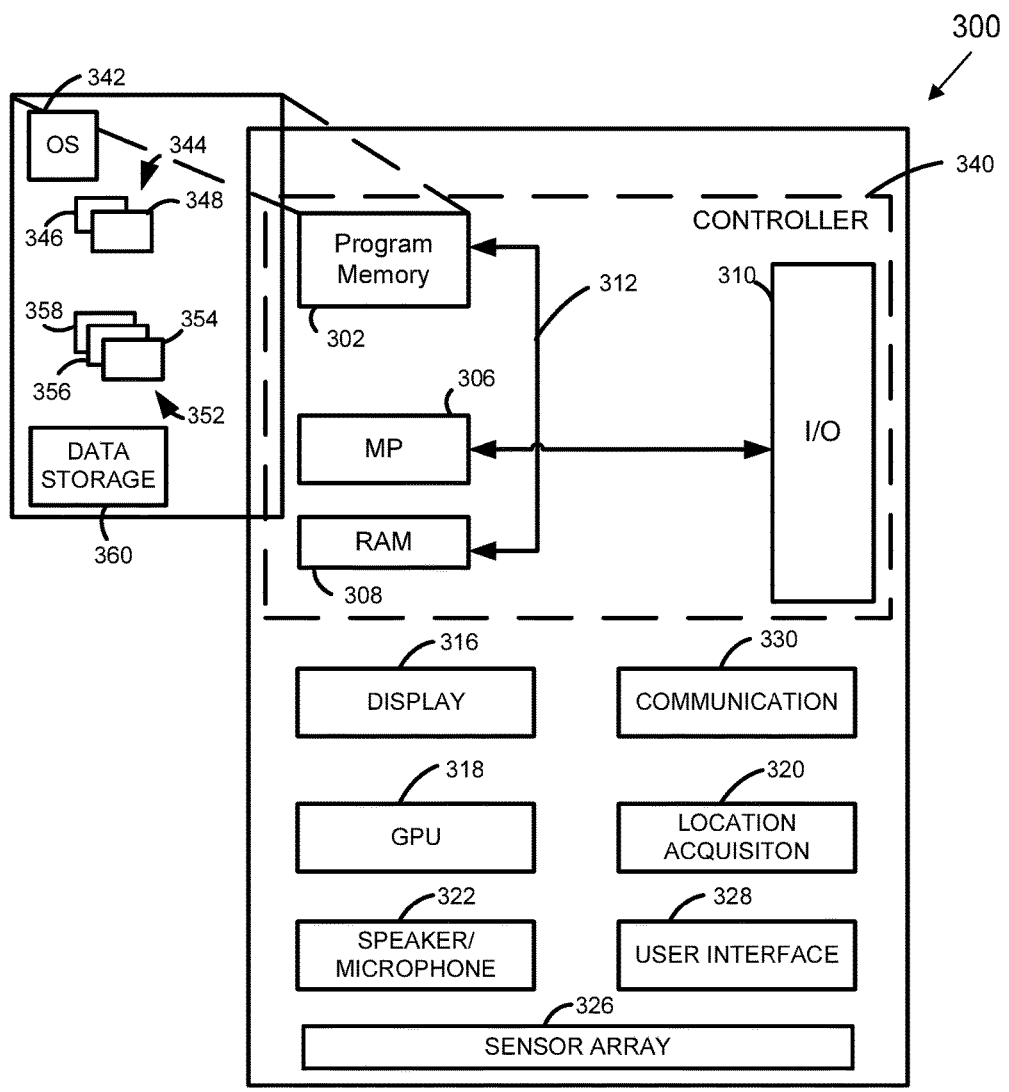
FIG. 3 illustrates a block diagram of an exemplary computing device 300 in accordance with an exemplary aspect of the present disclosure.

FIG. 3 illustrates a block diagram of an exemplary computing device or mobile device 300 in accordance with an exemplary aspect of the present disclosure. Computing device 300 may be implemented as any suitable computing device configured to (1) monitor, measure, generate, and/or or collect telematics data; (2) broadcast the geographic location data and/or the telematics data to one or more external components, such as via wireless communication and/or data transmission; (3) receive geographic location data and/or telematics data broadcasted from another device, such as via wireless communication and/or data transmission; (4) determine whether an anomalous condition exists at the geographic location indicated by the geographic location data based upon the telematics data; (5) generate one or more alerts indicative of the anomalous condition; and/or (6) broadcast one or more alert notifications to other devices, such as via wireless communication and/or data transmission.

Computing device 300 may include a display 316, a graphics processing unit (GPU) 318, a location acquisition unit 320, a speaker/microphone 322, a sensor array 326, a user interface 328, a communication unit 330, and/or a controller 340.

In one aspect, controller 340 may include a program memory 302, a microprocessor (MP) 306, a random-access memory (RAM) 308, and/or an input/output (I/O) interface 310, each of which may be interconnected via an address/data bus 312. Controller 340 may be implemented as any suitable type and/or number of processors, such as a host processor for the relevant device in which computing device 300 is implemented, for example. In some aspects, controller 340 may be configured to communicate with additional data storage mechanisms that are not shown in FIG. 3 for purposes of brevity (e.g., one or more hard disk drives, optical storage drives, solid state storage devices, etc.) that reside within or are otherwise associated with computing device 300.

Program memory 302 may store data used in conjunction with one or more functions performed by computing device 300 to facilitate the interaction between computing device 300 and one or more other devices. For example, if computing device 300 is implemented as a mobile computing device (e.g., mobile computing device 204.1, as shown in FIG. 2), then program memory 302 may store one or more programs, applications, algorithms, etc. that, when executed by controller 340, facilitate the interaction between mobile computing device 204.1 and (i) one or more networks (e.g., network 201), (ii) other mobile computing devices (e.g., mobile computing device 204.2 and/or mobile computing device 212), (iii) external computing devices (e.g., external computing device 206), (iv) vehicles (e.g., vehicle 108), (v) vehicle on-board computers (e.g., on-board computer 114), (vi) infrastructure components (e.g., smart infrastructure component 208), etc.

In various aspects, program memory 302 may be implemented as a non-transitory tangible computer readable media configured to store computer-readable instructions, that when executed by controller 340, cause controller 340 to perform various acts. Program memory 302 may include an operating system 342, one or more software applications 344, and one or more software routines 352. To provide another example, program memory 302 may include other portions to store data that may be read from and written to by MP 306, such as data storage 360, for example.

In one aspect, one or more MPs (micro-processors) 306 may be configured to execute one or more of software applications 344, software routines 352 residing in program memory 302, and/or other suitable software applications. For example, operating system 342 may be implemented as any suitable operating system platform depending upon the particular implementation of computing device 300. For example, if computing device 300 is implemented as a mobile computing device, operating system 342 may be implemented as a mobile OS platform such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

In one embodiment, data storage 360 may store data such as application data for the one or more software applications 344, routine data for the one or more software routines 352, geographic location data and/or telematics data, etc.

Display 316 may be implemented as any suitable type of display and may facilitate user interaction with computing device 300 in conjunction with user interface 328. For example, display 316 may be implemented as a capacitive touch screen display, a resistive touch screen display, etc. In various embodiments, display 316 may be configured to work in conjunction with controller 340 and/or GPU 318 to display alerts and/or notifications received from other devices indicative of detected anomalous conditions.

Communication unit 330 may be configured to facilitate communications between computing device 300 and one or more other devices, such as other mobile computing devices, networks, external computing devices, smart infrastructure components, etc. As previously discussed with reference to FIGS. 1 and 2, computing device 300 may be configured to communicate with these other devices in accordance with any suitable number and type of communication protocols. Thus, in various aspects, communication unit 330 may be configured to support any suitable number and type of communication protocols based upon a particular network and/or device in which computing device 300 is communicating to facilitate this functionality.

Communication unit 330 may be configured to support separate or concurrent communications, which may be the same type of communication protocol or different types of communication protocols. For example, communication unit 330 may be configured to facilitate communications between computing device 300 and an external computing device (e.g., external computing device 206) via cellular communications while facilitating communications between computing device 300 and the vehicle or train in which it is carried (e.g., vehicle 108 or train 210) via BLUETOOTH communications.

Communication unit 330 may be configured to broadcast data and/or to receive data in accordance with any suitable communications schedule. For example, communication unit 330 may be configured to broadcast geographic location data and/or telematics data every 15 seconds, every 30 seconds, every minute, etc. As will be further discussed below, the geographic location data and/or telematics data may be sampled in accordance with any suitable sampling period. Thus, when broadcasted by communications unit 330 in accordance with a recurring schedule, the geographic location data and/or telematics data may include a log or collection of the geographic location data and/or telematics data that was sampled since the last data transmission. A suitable communication schedule may be selected as a tradeoff between a desired anomalous condition detection speed and battery usage of computing device 300, when applicable.

Additionally or alternatively, aspects include communication unit 330 being configured to conditionally send data, which may be particularly advantageous when computing device 300 is implemented as a mobile computing device, as such conditions may help reduce power usage and prolong battery life. For example, communication unit 330 may be configured to only broadcast when telematics data has been sampled since the last transmission, which will be further discussed below with regards to sensor array 326. Controller 340 may determine whether has been sampled since the last transmission by, for example, analyzing a memory address range (e.g., in data storage 360, RAM 308, etc.) associated with the storage of the telematics data and comparing the contents of this buffer to a known range of valid values.

To provide another example, aspects include communication unit 330 being additionally or alternatively configured to only broadcast telematics data when computing device 300 is connected to a power source (e.g., an in-vehicle or in-train charger). To provide still another example, aspects include communication unit 330 being additionally or alternatively configured to only broadcast telematics data when communication unit 330 is connected to and/or communicating with a device identified as a vehicle. This may include, for example, identifying a BLUETOOTH connection as a valid vehicle to satisfy this condition upon installation and/or setup of the relevant application or program executed by computing device 300 to facilitate the functionality described herein.

Location acquisition unit 320 may be configured to generate geographic location data utilizing any suitable global positioning techniques. For example, location acquisition unit 320 may communicate with one or more satellites and/or wireless transmitters to determine a location of computing device 300. Location acquisition unit 320 may use "Assisted Global Positioning System" (A-GPS), satellite GPS, or any other suitable global positioning protocol (e.g., the GLONASS system operated by the Russian government, the Galileo system operated by the European Union, etc.) to determine a geographic location of computing device 300.

In one aspect, location acquisition unit 320 may periodically store one or more geographic locations of computing device 300 as geographic location data in any suitable portion of memory utilized by computing device 300 (e.g., program memory 302, RAM 308, etc.) and/or to another device (e.g., another mobile computing device, an external computing device, etc.). In this way, location acquisition unit 320 may sample the location of computing device 300 in accordance with any suitable sampling rate (e.g., every 5 seconds, 10 seconds, 30 seconds, etc.) and store this geographic location data representing the position of computing device 300, and thus the vehicle or train in which it is travelling, over time.

Speaker/microphone 322 may be configured as one or more separate devices. Speaker/microphone 322 may include a microphone configured to detect sounds and to convert sounds to data suitable for communications via communications unit 330. Speaker/microphone 322 may additionally or alternatively include a speaker configured to play sound in response to data received from one or more components of computing device 300 (e.g., controller 340). In one embodiment, speaker/microphone 322 may be configured to play audible alerts.

User-interface 328 may be implemented as any suitable device configured to collect user input, such as a "soft" keyboard displayed on display 316 of computing device 300, a keyboard attached to computing device 300, an external keyboard communicating via a wired or a wireless connection (e.g., a BLUETOOTH keyboard), an external mouse, etc.

Sensor array 326 may be configured to measure any suitable number and/or type of sensor metrics as part of the telematics data. In one aspect, sensor array 326 may be implemented as one or more sensors positioned to determine the speed, force, heading, direction, and/or any other suitable metric(s) (e.g., any other suitable metric(s) corresponding to one or more examples of train telematics data discussed above) associated with movements of computing device 300 and, thus, a vehicle or train in which computing device 300 is positioned. Additionally or alternatively, sensor array 326 may be configured to communicate with one or more portions of computing device 300 to measure, collect, and/or generate one or more sensor metrics from one or more non-sensor sources, which will be further discussed below. Generally speaking, any suitable metric(s) and/or other indications corresponding to one or more examples of train telematics data discussed herein may be measured, collected, and/or generated.

To generate one or more sensor metrics, sensor array 326 may include, for example, one or more cameras, accelerometers, gyroscopes, magnetometers, barometers, thermometers, proximity sensors, light sensors, Hall Effect sensors, etc. In aspects in which sensor array 326 includes one or more accelerometers, sensor array 326 may be configured to measure and/or collect accelerometer metric values utilizing an X-axis, Y-axis, and Z-axis accelerometer. In accordance with such aspects, sensor array 326 may measure sensor metric values as a three-dimensional accelerometer vector that represents the movement of computing device 300 in three dimensional space by combining the outputs of the X-axis, Y-axis, and Z-axis accelerometers using any suitable techniques.

In one aspect, sensor array 326 may include one or more cameras or other image capture devices. In accordance with such aspects, the one or more cameras that are part of sensor array 326 may be mounted or otherwise positioned on computing device 300 such that, when computing device 300 (e.g., a mobile computing device) is docked, cradled, or otherwise mounted within a vehicle or train, images may be captured from this vantage point. For example, when computing device 300 is mounted within a vehicle, a camera implemented by sensor array 326 may function as a dashboard camera, capturing images and/or video data of various objects outside of the vehicle from this vantage point. Additionally or alternatively, computing device 300 may capture audio data with the image and/or video data via speaker/microphone 322.

In various aspects, computing device 300 may begin to capture data upon detecting that it has been placed in a cradle, and otherwise not capture data in such a manner. This detection may occur, for example, via one or more conditions being satisfied. For example, computing device 300 may utilize one or more sensors (e.g., an accelerometer that is part of sensor array 326) to determine that computing device 300 has changed orientation to horizontal (as is common when docked), that computing device 300 is communicating via BLUETOOTH with the vehicle or train, that the vehicle or train is moving above a threshold speed, etc. Aspects include any suitable number of conditions, upon being satisfied, triggering computing device 300 to start collecting telematics data, images, audio, video, etc., via sensor array 326.

In various aspects, sensor array 326 may be configured to sample the one or more sensor metrics in accordance with any suitable sampling rate and/or based upon one or more conditions being satisfied. For example, sensor array 326 may be configured to implement one or more accelerometers to sample sensor metrics indicative of a g-force associated with vehicle or train braking, acceleration, and cornering at a rate of 15 Hz, 30 Hz, 60 Hz, etc., which may be the same sampling rate as one another or different sampling rates. To provide another example, sensor array 326 may be configured to implement one or more gyroscopes to improve the accuracy of the measured one or more sensor metrics and to determine whether computing device 300 is in use or stationary within a vehicle or train. To provide another example, sensor array 326 may implement a compass (magnetometer) to determine a direction or heading of a vehicle or train in which computing device 300 is located.

Again, sensor array 326 may additionally or alternatively communicate with other portions of computing device 300 to obtain one or more sensor metrics even though these sensor metrics may not be measured by one or more sensors that are part of sensor array 326. For example, sensor array 326 may communicate with one or more of location acquisition unit 320, communication unit 330, and/or controller 340 to obtain data such as timestamps synchronized to the sampling of one or more sensor metrics (which may be measured to within hundredths of a second or smaller resolutions), geographic location data (and correlated timestamps thereof), a velocity based upon changes in the geographic location data over time, a battery level of computing device 300, whether a battery of computing device 300 is charging, whether computing device 300 is being handled or otherwise in use, an operating status of computing device 300 (e.g., whether computing device 300 is unlocked and thus in use).

In various aspects, sensor array 326 may base timestamps upon any suitable clock source, such as one utilized by location acquisition unit 320 for GNSS functions. The timestamps may be, for example, recorded or logged as various data is sampled to be synchronized to the sampling of one or more sensor metrics (which may be measured to within hundredths of a second or smaller resolutions).

Additionally or alternatively, sensor array 326, location acquisition unit 320, and/or communication unit 330 may log or otherwise measure various metrics or other data that may be used by controller 340 to determine how often the functionality of the Telematics Application is being utilized when a vehicle or train is being driven. For example, sensor array 326 may log the time when telematics data is being collected, when the Telematics Application is running, and/or when the Telematics Application has been started. To provide additional examples, communication unit 330 may store data indicative of a BLUETOOTH connection status of computing device 300. To provide yet another example, location acquisition unit 320 may store and/or log the changes in geographic location of computing device 300 over time.

In various aspects, controller 340 may determine how often a driver uses the Telematics App based upon any suitable combination of the aforementioned data. For example, the BLUETOOTH connection status may be leveraged to determine whether computing device 300 is located in a vehicle. To provide another example, the changes in the geographic location data over time may be utilized to determine whether computing device 300 has exceeded a threshold speed for a threshold duration of time. In this way, a determination may be made whether computing device 300 is located in a vehicle while the vehicle is being driven.

Various aspects include the aforementioned data being leveraged to calculate a usage amount in which a user utilizes the Telematics App while driving. For example, the usage amount may be based upon a total proportion of time (e.g., 80% of the time while driving, the functionality provided by the Telematics App is enabled). To provide another example, the usage amount may be mileage-based (e.g., 90% of the miles driven are done so with the functionality of the Telematics App available to the driver). As discussed above, this usage data may be sent to an insurer or other third party via a telematics data transmission or a separate transmission and used to set and/or adjust an insurance policy, premium, or discount for the insured customer.

In one aspect, sensor array 326 may sample one or more sensor metrics based upon one or more conditions being satisfied. For example, sensor array 326 may determine, based upon gyroscope sensor metrics, communication with controller 340, etc., whether computing device 300 is in use. If computing device 300 is in use (e.g., when implemented as a mobile computing device) then the movement of computing device 300 within the vehicle or train may not truly represent the vehicle or train motion, thereby causing sensor metrics sampled during this time to be erroneous. Therefore, aspects include sensor array 326 sampling the one or more sensor metrics when computing device 300 is not in use, and otherwise not sampling the one or more sensor metrics.

In one aspect, sensory array 326 may include one or more cameras and/or image capture devices. When sensory array 326 is implemented with one or more cameras, these cameras may be configured as any suitable type of camera configured to capture and/or store images and/or video. For example, when computing device 300 is mounted in a vehicle or train, the camera may be configured to store images and/or video data of the road or track in front of the vehicle or train in which it is mounted, and to store this data to any suitable portion of program memory 302 (e.g., data storage 360). Controller 340 and/or MP 306 may analyze this data to generate one or more local alerts, to transmit signals indicative of detected alerts to one or more other devices, etc., which is further discussed below with reference to the execution of anomalous condition detection routine 358.

Again, the telematics data broadcasted by computing device 300 may include one or more sensor metrics. However, the telematics data may additionally or alternatively include other external data that may be relevant in determining the presence of an anomalous condition. For example, the telematics data may include external data such as speed limit data correlated to a road upon which computing device 300 is located (and thus the vehicle in which it is travelling), an indication of a type of road, a population density corresponding to the geographic location data, etc.

In some aspects, computing device 300 may obtain this external data by referencing the geographic location data to locally stored data (e.g., data stored in data storage 360) and broadcasting this data appended to or otherwise included with the sensor metrics data as part of the telematics data. In other aspects, the device receiving the telematics data (e.g., a mobile computing device, an external computing device, an infrastructure component) may generate the external data locally or via communications with yet another device. As will be further discussed below, this external data may further assist the determination of whether an anomalous condition is present.

In some aspects, software applications 344 and/or software routines 352 may reside in program memory 302 as default applications that may be bundled together with the OS of computing device 300. For example, web browser 348 may be part of software applications 344 that are included with OS 342 implemented by computing device 300.

In other aspects, software applications 344 and/or software routines 352 may be installed on computing device 300 as one or more downloads, such as an executable package installation file downloaded from a suitable application store via a connection to the Internet. For example, alert notification application 346, telematics collection routine 354, geographic location determination routine 356, and/or anomalous condition detection routine 358 may be stored to suitable portions of program memory 302 upon installation of a package file downloaded in such a manner. Examples of package download files may include downloads via the iTunes store, the Google Play Store, the Windows Phone Store, downloading a package installation file from another computing device, etc. Once downloaded, alert notification application 346 may be installed on computing device 300 as part of an installation package such that, upon installation of alert notification application 346, telematics collection routine 354, geographic location determination routine 356, and/or anomalous condition detection routine 358 may also be installed.

In one embodiment, software applications 344 may include an alert notification application 346, which may be implemented as a series of machine-readable instructions for performing the various tasks associated with executing one or more embodiments described herein. In one aspect, alert notification application 346 may cooperate with one or more other hardware or software portions of computing device 300 to facilitate these functions.

In one aspect, alert notification application 346 may function as a Telematics Application (or "App") which is downloaded and installed on computing device (or mobile device) 300 by a user via a suitable third-party software store and/or portal (e.g., Apple iTunes, Google Play, the Windows Store, etc.).

To provide an illustrative example, software applications 344 may include instructions for performing tasks such as determining a geographic location of computing device 300 (e.g., via communications with location acquisition unit 320), monitoring, measuring, generating, and/or collecting telematics data, broadcasting the geographic location data and/or the telematics data to one or more external devices, receiving geographic location data and/or telematics data from another computing device, determining whether an anomalous condition exists based upon the geographic location data and/or the telematics data, generating one or more alerts indicative of the determined anomalous condition, receiving user input, facilitating communications between computing device 300 and one or more other devices in conjunction with communication unit 330, etc.

Software applications 344 may include a web browser 348. In some embodiments (e.g., when computing device 300 is implemented as a mobile computing device), web browser 348 may be a native web browser application, such as Apple's Safari®, Google Android™ mobile web browser, Microsoft Internet Explorer® for Mobile, Opera Mobile™, etc. In other embodiments, web browser 348 may be implemented as an embedded web browser.

Regardless of the implementation of web browser 348, various aspects include web browser 348 being implemented as a series of machine-readable instructions for interpreting and displaying web page information received from an external computing device (e.g., external computing device 206, as shown in FIG. 2). This web page information may be utilized in conjunction with alert notification application 346 to perform one or more functions of the aspects as described herein.

In one embodiment, software routines 352 may include a telematics collection routine 354. Telematics collection routine 354 may include instructions, that when executed by controller 340, facilitate sampling, monitoring, measuring, collecting, quantifying, storing, encrypting, transmitting, and/or broadcasting of telematics data (e.g., train telematics data such as the train telematics data described in greater detail herein). In some aspects, telematics collection routine 354 may facilitate collection of telematics data locally via one or more components of computing device 300 (e.g., via sensor array 326, location acquisition unit 320, controller 340, etc.). In other aspects, telematics collection routine 354 may facilitate the storage of telematics data received from another device (e.g., via communication unit 330).

In one aspect, telematics collection routine 354 may work in conjunction with controller 340 and/or alert notification application 346 to periodically listen for and/or to periodically broadcast telematics data. For example, controller 340 may, upon executing alert notification application 346, periodically listen for a broadcast containing telematics data generated and transmitted from other computing devices, vehicles, trains, external computing devices, and/or smart infrastructure components. Upon detecting a broadcast, controller 340 may download the broadcast to a suitable portion of program memory 302 and analyze the telematics data contained therein for potential traffic events, travel events, one or more trains passing through one or more railroad crossings, alerts, messages, etc. Such aspects may be particularly useful, for example, to save battery life of the computing device, as continuous listening is not necessary but instead may be performed, for example, in accordance with a particular timing schedule.

To provide another example, controller 340 may, upon executing alert notification application 346, periodically broadcast telematics data, which may be received by other computing devices, vehicles, trains, external computing devices, and/or smart infrastructure components.

In one embodiment, software routines 352 may include a geographic location determination routine 356. Geographic location determination routine 356 may include instructions, that when executed by controller 340, facilitate sampling, measuring, collecting, quantifying, storing, transmitting, and/or broadcasting of geographic location data (e.g., latitude and longitude coordinates of a train (e.g., train 210)). In some aspects, geographic location determination routine 356 may facilitate generating and/or storing geographic location data locally via one or more components of computing device 300 (e.g., via location acquisition unit 320 and/or communication unit 330). In some aspects, geographic location determination routine 356 may additionally or alternatively facilitate the storage of geographic location data received from another device (e.g., via communication unit 330).

Additionally or alternatively, software routines 352 may include anomalous condition detection routine 358. Anomalous condition detection routine 358 may include instructions, that when executed by controller 340, facilitate the determination of whether an anomalous condition exists (e.g., a train passing through a railroad crossing) based upon the telematics data, the geographic location data, and/or image and/or video data captured by one or more cameras or other imaging devices. An anomalous condition may include any suitable condition that indicates a deviation from normal traffic patterns, including the ability of a vehicle(s) to drive over or through a railroad crossing without waiting for a train to pass. For example, if an accident occurs, traffic may slow down due to a car pileup, a reduction in available lanes, and/or rerouting of traffic. Because the telematics data may include data indicative of the speed limit at the location corresponding to the geographic location where the telematics data was sampled, a comparison between the speed of computing device 300 and the posted or other speed limit data (such as a comparison between mobile device or vehicle speed with a map of, and/or known, posted speed limit information) may indicate an anomalous condition. In an aspect where determining whether an anomalous condition exists includes determining whether a train is passing (or will pass, etc.) through a railroad crossing, the speed of computing device 300 may be or may be included within the train telematics data. Furthermore, because each vehicle and/or train may sample and/or broadcast geographic location data and/or telematics data in real time, the anomalous conditions may be detected with minimal delay as they occur.

Although the speed of the vehicle and/or train may indicate an anomalous condition, aspects include other types of anomalous conditions being detected based upon the telematics data. For example, an anomalous condition may be identified when the one or more sensor metrics indicate that an airbag has been deployed, and thus the vehicle associated with computing device 300 has been in an accident. This may be determined, for example, via an analysis of barometer readings matching a pressure versus time profile and/or via an indication from a dedicated airbag deployment sensor located in the vehicle.

To provide another example, an anomalous condition may be identified based upon weather fluctuations associated with a rapid formation of ice, a sudden change from a paved to a dirt road, the triggering of a crash detection system, a threshold number of wheel slips and/or skids being sampled within a threshold sampling period (indicating slippery conditions), sensor metrics indicative of a rollover condition, a sudden stop (indicating a collision), a departure from the road (indicating a pulled over vehicle), etc.

To provide an illustrative example based upon a train passing through a railroad crossing, mobile computing device 212 (which may be an implementation of computing device 300) may determine that a geographic location of train 210 is within a predetermined or threshold distance of smart infrastructure component 208 implemented as a railroad crossing (e.g., a smart railroad crossing). Mobile computing device 212 may, upon execution of anomalous condition detection routine 358, conclude that train 210 will pass through the railroad crossing at a particular time based upon, for example, speed, acceleration, and/or any other suitable metrics and/or data that may be included in the train telematics data as discussed herein. Upon determination of the anomalous condition, alert notification application 346 may broadcast a notification indicating the detected anomalous condition, the telematics data, and/or the geographic location data associated with the detected anomalous condition.

One or more vehicles (e.g., vehicle 202.1 and/or vehicle 202.2) may be equipped with additional computing devices 300 (e.g., implemented as mobile computing device 204.1 and/or mobile computing device 204.2), and may receive this data and determine whether the anomalous condition is relevant to the respective vehicle(s) based upon, for example, the geographic relationship between the vehicle(s) and train 210, and/or based upon other train telematics data. If the anomalous condition is relevant, then mobile computing device 204.1 and/or mobile computing device 204.2, for example, may generate an alert(s) indicating the anomalous condition. For instance, the alert(s) may include directing the driver(s) of the respective vehicle(s) and/or directing the respective autonomous vehicle(s) to travel along an alternate route(s), to stop at the railroad crossing that train 210 will pass through (or is passing through), and/or to stop at another railroad crossing(s). The other railroad crossing(s) may be, for instance, other railroad crossing(s) near the railroad crossing that train 210 will pass through and that is/are along the route(s) currently being traveled by the vehicle(s) or autonomous vehicle(s)).

In another aspect, the notification indicating the detected anomalous condition may not be broadcast, and mobile computing device 204.1 and/or 204.2, for example, may receive the telematics data and/or the geographic location data and determine whether an anomalous condition exists that is relevant to the respective vehicle(s) based upon this received data. If the anomalous condition is relevant, then mobile computing device 204.1 and/or mobile computing device 204.2, for example, may generate an alert as described above. It should be appreciated that in the foregoing examples directed to a train passing through a railroad crossing, train telematics data may be received, for instance, directly from a train transceiver (which may be a transceiver of mobile computing device 212, a transceiver of a dedicated device that is located in or otherwise associated with train 210 and that transmits train telematics data, etc.) or indirectly from a smart railroad crossing. As noted above, the smart railroad crossing may be an implementation of smart infrastructure component 208.

To provide an illustrative example based upon a traffic accident, if a first vehicle carrying a first computing device 300 is slowed down due to a traffic accident, then the one or more sensor metrics sampled by sensor array 326 will indicate the speed of the first vehicle over a period of time. If the one or more sensor metrics indicate that the first vehicle's speed is below the speed limit by some threshold amount or proportion thereof (e.g., 20 mph in a 55 mph zone, 50% of the posted speed limit, etc.) and this is maintained for a threshold duration of time (e.g., 30 seconds, one minute, two minutes, etc.) then controller 340 may, upon execution of anomalous condition detection routine 358, conclude that an anomalous condition has been detected. This anomalous condition may also be correlated to the geographic location associated with the geographic location data due to synchronization between the geographic location data and the sampled telematics data.

Further continuing this example, upon determination of the anomalous condition, alert notification application 346 may broadcast a notification indicating the detected anomalous condition, the telematics data, and/or the geographic location data associated with the detected anomalous condition. In one aspect, a second vehicle equipped with a second computing device 300 may receive this data and further determine whether the anomalous condition is relevant based upon the geographic relationship between the first and second devices, which is further discussed below. If the anomalous condition is relevant, then the second computing device 300 may generate an alert indicating the anomalous condition.

To provide another example by modifying the details of the previous one, aspects may include computing device 300 broadcasting telematics data and/or geographic location data but not notification data. In accordance with such aspects, upon being received by a second computing device 300 (e.g., a mobile computing device in a second vehicle, an external computing device, a smart infrastructure component, etc.) the second computing device 300 may determine the relevance of the anomalous condition based upon the geographic relationship between itself and the first computing device 300.

If the second computing device 300 determines that an anomalous condition, even if present, would be irrelevant or inapplicable based upon the distance between these devices, the second computing device 300 may ignore the telematics data, thereby saving processing power and battery life. However, if the second computing device 300 determines that the geographic location data indicates a potentially relevant anomalous condition, the second computing device 300 may further process the telematics data and take the appropriate relevant action if an anomalous condition is found (e.g., issue an alert notification, generate an alert, display a warning message, etc.).

To provide yet another example by further modifying the details in the previous two and including aspects of the examples relating to a train passing through a railroad crossing, aspects may include first computing device 300 associated with a vehicle or train broadcasting the telematics data and geographic location data to an external computing device (e.g., to external computing device 206 via network 201, as shown in FIG. 2). In addition, the second computing device 300 associated with the second vehicle (or a first vehicle, in some instances where first computing device 300 is associated with a train) may likewise broadcast telematics data and geographic location data to the external computing device. In accordance with such aspects, the external computing device may determine whether an anomalous condition exists and is relevant to one or more of the first and/or second computing devices 300 based upon, for example, a geographic relationship between the first and second computing devices 300. When relevant, external computing device may be configured to send alert notifications to the first and/or second computing devices 300, which may include any suitable type of communications such as push notifications, a short messaging service (SMS) message, an email, a notification that used in conjunction with the OS running on each respective computing device 300, etc. Upon receiving the notification from the external computing device, the first and/or second computing device 300 may generate an alert indicating, for example, a description of the anomalous condition and/or its location.

The geographic relationship between two or more computing devices 300 may be utilized in several ways to determine the relevance of the anomalous condition. For instance, current speed, location, route, destination, and/or direction of travel of a first vehicle or a train (collecting and/or associated with the telematics data) may be individually or collectively compared with current speed, location, route, destination, and/or direction of travel of a first vehicle or a second vehicle traveling on the road. As one example of the geographic relationship and use of the train telematics data, a train location, current speed, and/or route, etc. may be compared with a first vehicle location, current route, and/or destination, etc. to determine whether the first vehicle should divert course or slow down to alleviate the risk of the train and the first vehicle being involved in a collision.

As another example of the geographic relationship, a radius from one vehicle or a train, or a line-of-sight distance between vehicles or between a train and a vehicle, may be utilized and compared to a threshold distance. For example, if computing device 300 is implemented as an external computing device and determines a line-of-sight distance between a first and second vehicle (or between a vehicle and a train) to be less than a threshold distance (e.g., a half mile, one mile, etc.), then the external computing device may issue an alert notification to both vehicles (or to the vehicle and train). In this way, an external computing device may act as an alert management device, processing data and sending notifications to those devices for which a detected anomalous condition is relevant.

In another example of the geographic relationship, the geographic location data may be correlated with a map database to associate the anomalous condition with a road and to determine the relevance of the anomalous condition based upon other vehicles sharing the road. The map database may be stored, for example, in a suitable portion of computing device 300 (e.g., data storage 360) or retrieved via communications with one or more external computing devices. To provide an illustrative example, a computing device 300 may be implemented as an external computing device. The external computing device may determine, from telematics data and geographic location data received from a first computing device 300, that a first vehicle is located on a highway at a certain geographic location. If the external computing device determines that a second computing device 300 in a vehicle travelling on the same highway is within a threshold distance approaching the first vehicle, then the external computing device may issue an alert notification to the second vehicle.

In yet other aspects, the geographic location data may be correlated with a geofence database to determine the relevance of the anomalous condition based upon whether other vehicles are located inside the geofence. The geofence database may be stored, for example, in a suitable portion of computing device 300 (e.g., data storage 360) or retrieved via communications with one or more external computing devices. To provide another illustrative example, a computing device 300 may be implemented as an external computing device. The external computing device may determine, from telematics data and geographic location data received from a first computing device 300, that a first vehicle is located on a highway at a certain geographic location. The external computing device may calculate a geofence having a shape substantially matching the road upon which the first vehicle is travelling.

The geofence may be calculated as having any suitable shape such that the appropriate vehicles are notified of the detected anomalous condition. For example, the geofence shape may follow the contours of the road and extend ahead of the first vehicle and behind the first vehicle some threshold distances, which may be the same or different than one another. To provide another example, the geofence shape may include other arterial roads that feed into the road upon which the first vehicle is travelling, roads anticipated to be impacted by the anomalous condition, railroad crossings impacted and/or anticipated to be impacted by the anomalous condition, etc.

In some aspects, the geofence may be adjusted or modified based upon a change in the location of computing device 300. This change may be triggered using any suitable data indicative of potentially increasing road densities, such as changes in population density data associated with the geographic location of the computing device 300, changes in a type of road upon which computing device 300 is determined to be travelling, etc.

For example, a first computing device 300 may be implemented as a mobile computing device and associated with a first vehicle, while a second computing device 300 may be implemented as an external computing device. The external computing device may calculate an initial geofence as a threshold distance radius centered about the first vehicle's location. The geographic location data corresponding to the first vehicle's location may have associated population density data that is correlated with locally stored data or data retrieved by the external computing device. When the population density data surpasses a threshold density value, the shape of the geofence may be adjusted from the radius centered about the first vehicle's location to include only the road upon which the first vehicle is travelling. In this way, computing device 300 may prevent false alert notifications from being sent to other vehicles travelling in close proximity to the first vehicle, but on nearby roads unaffected by the detected anomalous condition.

To provide another illustrative example, as previously discussed, one or more cameras integrated as part of sensor array 326 may store image and/or video data from a vantage point within a vehicle in which computing device 300 is mounted to act as a dashboard camera. In accordance with such aspects, anomalous condition detection routine 358 may include instructions, that when executed by controller 340, facilitate the analysis of the image and/or video data to detect one or more anomalous conditions that may pose an immediate threat to the driver. These anomalous objects may also be identified as a travel or traffic event, as previously discussed. This analysis may be performed in accordance with any suitable object recognition and/or image analysis to detect images in the path of the vehicle, such as animals, pedestrians, other vehicles, trains, potholes, etc.

Upon detecting an anomalous object, computing device 300 may issue the appropriate alert via display 316 and/or sound an alarm via speaker/microphone 322. Additionally or alternatively, computing device 300 may, upon detecting an anomaly, broadcast one or more signals via communication unit 330, which are received directly or indirectly by other computing devices. Again, these other computing devices may then generate alert notifications locally when close to the geographic location of computing device 300 where the signal was broadcasted. Aspects in which the detected anomalous condition is shared in this manner may be particularly useful when the identified anomaly is likely to threaten other drivers using the same road, such as potholes or objects blocking the roadway, trains, etc.

Although FIG. 3 depicts controller 340 as including one program memory 302, one MP 306, and one RAM 308, controller 340 may include any suitable number of each of program memory 302, MP 306, and RAM 308. Furthermore, although FIG. 3 depicts controller 340 as having a single I/O interface 310, controller 340 may include any suitable number and/or types of I/O interfaces 310. In various aspects, controller 340 may implement RAM(s) 308 and program memories 302 as any suitable type of memory, such as non-transitory computer readable memories, semiconductor memories, magnetically readable memories, and/or optically readable memories, for example.

Exemplary Screenshots of an Alert Notification Application

Figure 4:
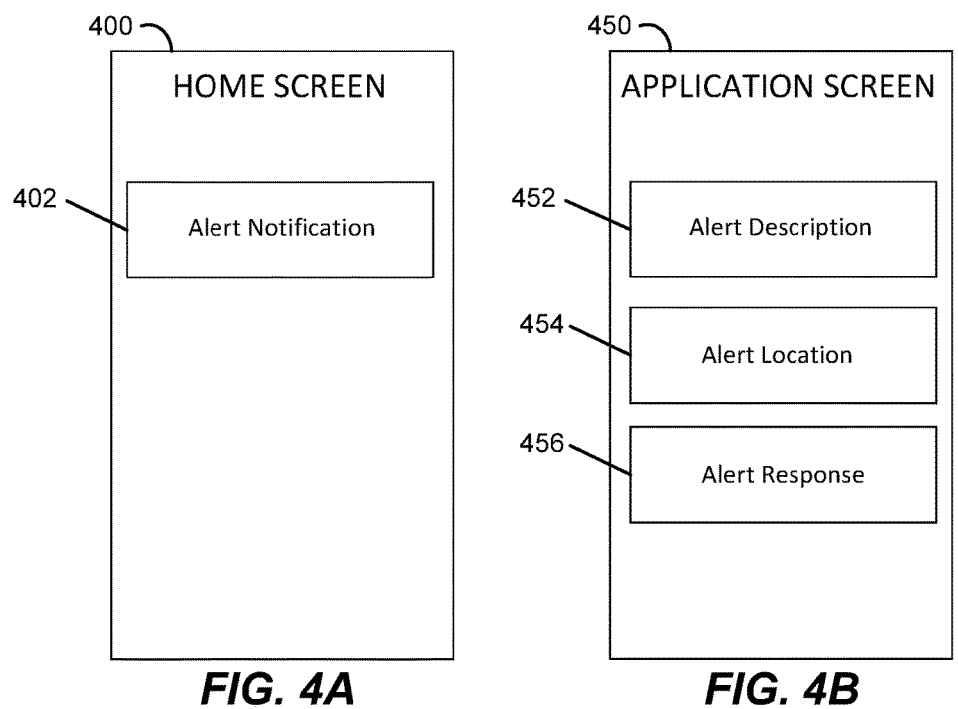
FIG. 4A illustrates an exemplary mobile computing device home screen 400 in accordance with an exemplary aspect of the present disclosure.
FIG. 4B illustrates an exemplary mobile computing device application screen 450 in accordance with an exemplary aspect of the present disclosure.

FIG. 4A illustrates an example mobile computing device home screen 400 in accordance with an exemplary aspect of the present disclosure. In various aspects, home screen 400 is displayed on a mobile computing device, such as mobile computing device 110 or mobile computing devices 204.1, 204.2, and/or 212 as shown in FIGS. 1 and 2, respectively. In accordance with such aspects, home screen 400 may be displayed as part of a device display, such as display 316, for example, as shown in FIG. 3.

Home screen 400 may be displayed as a default screen on a mobile computing device. In one embodiment, home screen 400 may facilitate a lock screen of a mobile computing device. Lock screens may be typically displayed when a user locks the mobile computing device to enter a lock screen mode (e.g., by pressing a physical button). Additionally or alternatively, the mobile computing device may revert to the lock screen when inactive for a threshold period of time. The lock screen prevents a user from using a portion of the mobile computing device functionality. For example, a lock screen might prevent a mobile computing device in a user's pocket from accidentally sending SMS messages or phone calls.

Although lock screens typically limit the functionality of the device when enabled, it may be desirable for certain applications to provide a user with some functionality via the lock screen. For example, if the mobile computing device is used to play music, a lock screen overlay could allow a user to change tracks, pause a track, or adjust the volume level without unlocking the phone. In accordance with some aspects, alert notification 402 may be displayed as part of a home screen and/or lock screen of a mobile computing device, as shown in FIG. 4A.

Although alert notification 402 may be displayed as part of home screen 400, other aspects include alert notification 402 being displayed as part of a notification system separate from home screen 400. For example, some mobile phone operating systems (e.g., the Android OS) implement a universal "pull-down" notification system where all incoming notifications are displayed. In these notification systems, new notifications are initially previewed in a notification bar at the top of the phone display, and a user may pull down the notification bar (e.g., by using a swiping gesture) to access the details of any received notifications. In one aspect, alert notification 402 may be displayed as part of a notification bar type notification.

As previously discussed with reference to FIG. 3, a device running the alert notification application may be configured to determine whether an anomalous condition has been detected and/or to receive alert notifications sent by other devices that have done so. In accordance with such aspects, alert notification 402 is a block diagram representation of what may be generated upon detection of an anomalous condition and/or receiving an indication that an anomalous condition has been detected. Alert notification 402 may be implemented as any suitable graphic, label, text, description, etc., to convey this to a user. In one embodiment, alert notification 402 may be interactive and may facilitate a user selection via an appropriate gesture (e.g., swiping, tapping, etc.).

FIG. 4B illustrates an example mobile computing device application screen 450 in accordance with an exemplary aspect of the present disclosure. In various aspects, application screen 450 may be displayed on a mobile computing device, such as mobile computing device 110 or mobile computing devices 204.1, 204.2, and/or 212, as shown in FIGS. 1 and 2, respectively. In accordance with such aspects, application screen 450 may be displayed as part of a device display, such as display 316, for example, as shown in FIG. 3.

In one aspect, application screen 450 may be displayed upon a user selecting alert notification 402 from home screen 400. Application screen 450 may include an alert description 452, an alert location 454, and an alert response 456. Alert description 452 is a block diagram representation of one or more descriptions of the alerts related to the detected anomalous condition. Alert description 452 may be implemented as any suitable graphic, label, text, description, etc., to convey this to a user. For example, alert description 452 may include a text description such as "slow traffic ahead," "traffic at standstill ahead," "unpaved road ahead," "potential icy conditions ahead," "pulled over vehicle ahead," "train passing through railroad crossing ahead," "train passing in X seconds," "train passing through for another Y seconds," etc.

Alert location 454 is a block diagram representation of one or more descriptions of the location of the anomalous condition. Alert location 454 may be implemented as any suitable graphic, label, text, description, etc., to convey this to a user. For example, alert location 454 may include a directional compass indicating a direction towards the anomalous condition from the mobile computing device displaying application screen 450. To provide additional examples, alert location 454 may include a distance to the anomalous condition, a map overlaid with the location of the mobile computing device displaying application screen 450 to indicate the position of the mobile computing device in relation to the anomalous condition, the threshold distances and/or geofences used to determine the relevance of the anomalous condition, etc.

Alert response 456 is a block diagram representation of one or more descriptions of a directed response to the anomalous condition. Alert response 456 may be implemented as any suitable graphic, label, text, description, etc., to convey this to a user. For example, alert response 456 may include a text indication to "stop at railroad crossing ahead," a map or other indication of an alternate route for a vehicle to take to avoid waiting at a railroad crossing for a train to pass, etc.

Insurance Applications

As noted herein, the present embodiments may be used to adjust, update, and/or generate insurance policies. Insurance policies, such as auto, usage-based, home, and/or household insurance policies, may be adjusted, updated, and/or generated for insureds or potential customers that have mobile devices and/or vehicles that are equipped or configured with one or more of the functionalities discussed herein.

For instance, insureds or family members may have mobile devices and/or vehicles that are configured to receive telematics data associated with trains, other vehicles and/or abnormal road or travel conditions that other drivers are experiencing. The telematics may be received directly from a train(s) or other vehicles, or indirectly from smart infrastructure and/or insurance provider remote servers. As a result, the insureds and/or their family members may be timely notified of traffic or travel events and then may take alternate routes (or even not drive or delay driving) to lower their risk of getting in an accident due to the traffic or travel events. An insurance provider may promote or reward such risk-averse behavior and/or safer driving with lower insurance premiums, rates, and/or increased discounts, such as for usage-based or other types of auto insurance.

Furthermore, an insurance provider may promote or reward the use of one or more aspects described herein with lower insurance premiums, rates, and/or increased discounts. For example, an insurer may provide discounts or other incentives upon an insured customer installing an application to their mobile computing device that enables the mobile computing device to broadcast telematics data and/or to generate alert notifications based upon telematics data received from other devices.

Additionally or alternatively, an insurer may provide discounts or other incentives upon an amount that an insured customer uses the telematics application on their mobile computing device that enables the mobile computing device to broadcast telematics data and/or to generate alert notifications based upon telematics data received from other devices. Such usage-based discounts or incentives may be based upon amount of time of, or number of miles of, use or usage, e.g., an amount of time or miles that the insured drove during a specific period with a Telematics App running or executing on their mobile device (which was located within the insured vehicle as it travels), the Telematics App configured to collect and broadcast telematics data, and/or to receive telematics data from other vehicles or devices, and generate alerts or recommendations based upon the data received.

Exemplary Smart Control Systems

Figure 5:
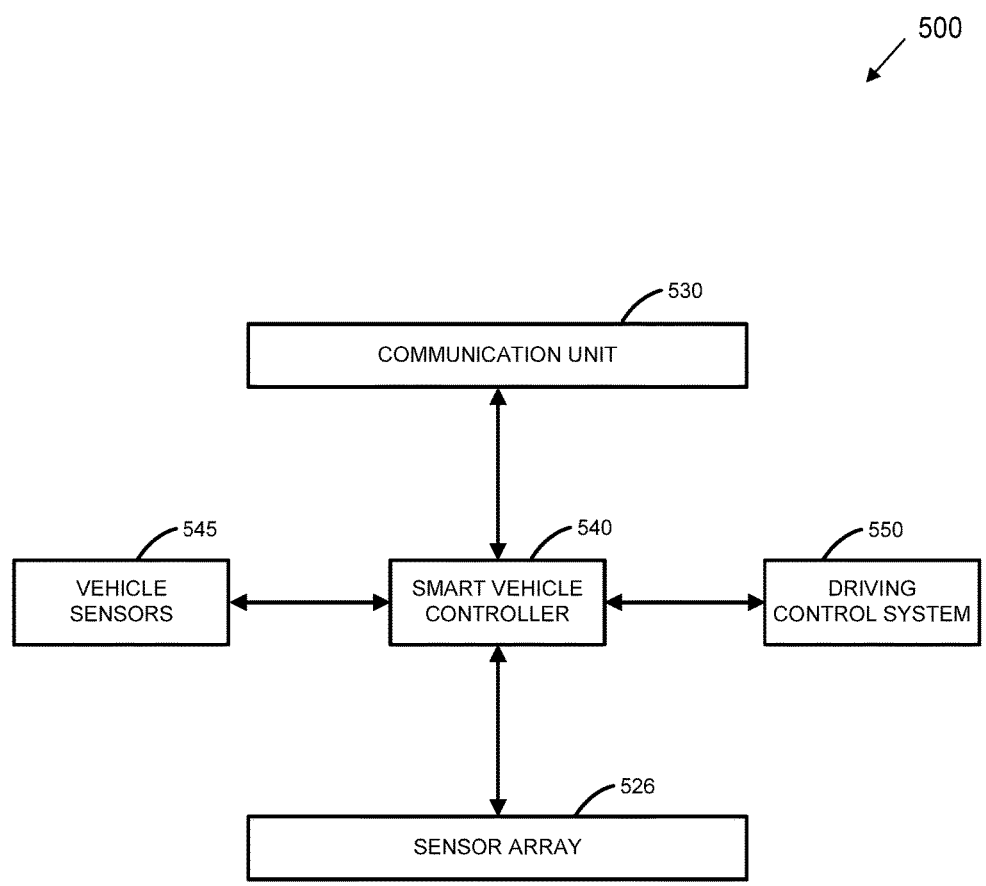
FIG. 5 illustrates a block diagram of an exemplary smart vehicle control system 500 in accordance with an exemplary aspect of the present disclosure.

FIG. 5 illustrates a block diagram of an exemplary smart vehicle control system 500 in accordance with an exemplary aspect of the present disclosure. In one aspect, smart vehicle control system 500 may be implemented as any suitable computing device, such as a computing device that is integrated as part of a smart vehicle to facilitate autonomous driving and/or other smart driving functions. For example, smart vehicle control system may be integrated as part of one or more vehicles 202.1-202.N, as shown in FIG. 2, to provide such vehicles with such functions. Smart driving functions may include, for example, the generation, receipt, collection, storage, and/or transmission of telematics data and/or other suitable data, such as previously discussed above with reference to on board computer 114, as shown in FIG. 1. Other suitable data may include other data discussed herein, such as, for example, geographic location data as discussed herein. In one aspect, a smart train controller or smart train control system may include similar features as smart vehicle control system 500 and may additionally or alternatively be integrated as part of a train (e.g., train 210), as further described below.

Smart vehicle control system 500 may include a sensor array 526, a communication unit 530, a smart vehicle controller 540, one or more vehicle sensors 545, and/or a driving control system 550, one or more of which may be configured to communicate with one another to receive data from, and send data to, one another. Smart vehicle control system 500 may include additional, less, or alternate functionality, including that discussed elsewhere herein, and/or discussed with reference to computing devices (e.g., mobile computing devices), remote servers, external computing devices, smart infrastructure, and/or trains.

In one aspect, sensor array 526, communication unit 530, and smart vehicle controller 540 may have a similar architecture, implementation, and/or perform similar functions as sensor array 326, communication unit 330, and controller 340, respectively, as previously discussed above with reference to FIG. 3. Therefore, only differences between sensor array 526, communication unit 530, and smart vehicle controller 540, as shown in FIG. 5, and sensor array 326, communication unit 330, and controller 340, as shown in FIG. 3, will be further discussed herein.

For instance, it will be appreciated that some differences between sensor array 526, communication unit 530, and smart vehicle controller 540, as shown in FIG. 5, and sensor array 326, communication unit 330, and controller 340, as shown in FIG. 3, respectively, may be due to differences between applications and design requirements of computing devices and vehicles. For example, smart vehicle controller 540 may include one or more microprocessors, program memory, RAM, I/O interfaces, etc. However, smart vehicle controller 540 may include faster microprocessors, additional memory, faster memory controllers, etc., than that of controller 340 to account for the additional processing and speed requirements associated with the higher processing functions of vehicles, particularly smart vehicles. To provide another example, smart vehicle controller 540 may include one or more processors specifically designed for adaptive vision processing at high speeds and/or utilizing parallel processing techniques to facilitate autonomous or semi-autonomous driving.

Likewise, sensor array 526 may have additional or alternative sensors, meters, and/or other suitable devices as compared to sensor array 326. Sensor array 526 may additionally or alternatively include any suitable number and/or type of sensors, meters, and/or other suitable devices to facilitate autonomous or semi-autonomous driving. Examples of sensors included in sensor array 526 may include, for example, radar systems configured to operate at any suitable number or range of wavelengths (e.g., millimeter-wavelengths), Lidar, ultrasonic sensors, etc.

Vehicle sensors 545 may include, for example, any suitable number and/or type of sensors, meters, and/or other suitable devices integrated as part of the vehicle in which smart vehicle control system 500 is installed or otherwise implemented. For example, vehicle sensors 545 may generate one or more sensor metrics or other data that is part of the telematics data and/or other data that is stored, collected, and/or broadcasted from smart vehicle control system 500 (e.g., via communication unit 530).

In some aspects, vehicle sensors 545 may sample sensor metrics or other information that is included as part of the telematics data and/or other data, as discussed elsewhere herein, while sensor array 526 may be implemented as one or more sensors associated with autonomous driving functions. Thus, in aspects in which smart vehicle control system 500 is implemented as part of a non-autonomous vehicle, vehicle sensors 545 and sensor array 526 may be implemented as a single sensor array.

Communication unit 530 may be configured to transmit telematics data (and/or other suitable data) including one or more sensor metrics or other information generated by vehicle sensors 545 and/or sensor array 526, which may be received by other computing devices (e.g., mobile computing devices), other smart vehicles, smart infrastructure, external computing devices, and/or trains, as discussed elsewhere herein. Additionally or alternatively, communication unit 530 may be configured to receive telematics data (and/or other suitable data) from other computing devices (e.g., mobile computing devices), other smart vehicles, smart infrastructure, external computing devices, and/or trains, as discussed elsewhere herein.

When transmitting telematics data and/or other data discussed herein, smart vehicle controller 540 may be configured to format the sensor metrics and/or other information generated, collected, and/or measured by vehicle sensors 545 and/or sensor array 526 into a data broadcast, determine whether the telematics data and/or other data should be updated, and/or broadcast the telematics data and/or other data. Additionally or alternatively, smart vehicle controller 540 may be configured to analyze the telematics data and/or other data to identify one or more anomalous conditions (e.g. travel events, traffic events), and/or alerts, to generate one or more messages associated with the telematics data (and/or other data) and/or detailing the type and/or extent of an identified anomaly and/or alert, etc.

Furthermore, smart vehicle controller 540 may be configured to broadcast or otherwise direct a transmission of the message via data transmission and/or wireless communication (e.g., via communication unit 530) to another computing device (such as a mobile computing device, another vehicle, a remote server, smart infrastructure, etc.). As further discussed herein, devices receiving the message and/or the telematics data and/or other data may utilize such received information to perform various functions, issue alerts to drivers, etc. In this way, the messages, telematics data, and/or other data transmitted by smart vehicle control system 500 may facilitate safer travel for another vehicle and/or another driver.

Similar to the other devices described above (e.g., mobile computing device 300), when receiving data, smart vehicle controller 540 may be configured to perform various functions such as issuing alerts to drivers when the data contains a warning message and/or identifying an anomalous condition by analyzing the received data.

Driving control system 550 may be implemented with any suitable number and/or type of driving controllers to control the direction, movement, and/or speed of the vehicle in which smart vehicle control system 500 is installed. For example, driving control system 550 may include various drive-by-wire interfaces to facilitate controlling the speed of the vehicle and to turn the vehicle without user input. To provide an additional example, driving control system may include various braking controllers and/or transmission controllers to slow the vehicle and to shift the vehicle into different gears.

In accordance with one aspect, smart vehicle controller 540 may communicate with one or more components of driving control system 550 in response to telematics data, information, and/or messages received via communication unit 530. For example, if the telematics data indicates a road hazard at a certain location and/or in a certain road lane, then smart vehicle controller 540 may issue one or more commands to driving control system 550 to steer the vehicle into a clear lane, thus avoiding the road hazard. As another example, if the telematics data and/or one or more messages indicate that a train is within a predetermined distance of a railroad crossing, then smart vehicle controller 540 may issue one or more commands to driving control system 550 to re-route or stop the vehicle.

Driving control system 550 may include different types of feedback components and/or control systems based upon the type of vehicle in which smart vehicle control system 500 is implemented or installed. For example, driving control system 550 may include various interfaces and/or control systems to facilitate autonomous driving in conjunction with smart vehicle controller 540. But if smart vehicle control system 500 is implemented in a non-autonomous vehicle, driving control system 550 may work in conjunction with smart vehicle controller 540 to receive one or more signals and/or data associated with traditional driving functions (e.g., manual acceleration, steering, braking, etc.).

Regardless of the type of vehicle in which smart vehicle control system 500 is implemented, smart vehicle controller 540 may work in conjunction with driving control system 550 to support any suitable number and/or types of driver feedback. To provide this feedback, driving control system 550 may include any suitable number and/or types of displays, user interfaces, speakers, buzzers, etc.

For example, driving control system 550 may include various feedback components to provide visual and/or auditory feedback regarding the operation of the vehicle and/or information regarding anomalous conditions, alerts, warnings, recommendations, etc., which may be based upon an analysis of telematics data and/or other suitable data. Again, the telematics data and/or other suitable data may be received from another computing device (e.g., via communication unit 530) and/or generated and analyzed locally at smart vehicle control system 500.

To provide another example, smart vehicle controller 540 may include one or more memory units configured to store cartographic and/or map data. In response to user input received via a user interface implemented by driving control system 550, smart vehicle controller 540 may generate, calculate, and/or display travel routes, which may provide navigational guidance to a driver. Furthermore, smart vehicle controller 540 may perform functions associated with the determination of whether an identified anomaly (e.g., a traffic event, travel event such as an approaching train, abnormal condition, etc.), which has been determined from an analysis of received telematics data from another device, is relevant to the vehicle in which smart vehicle control system 500 is implemented.

This determination of relevance may be made, for example, by comparing a location (e.g., geographic coordinates included in a telematics data transmission) to the current location of the vehicle in which smart vehicle control system 500 is implemented to determine whether the locations are within a threshold distance of one another. The determination may also be made, for example, when the identified anomaly or other abnormal condition is or will be (e.g., in the case of an approaching train) located along a current travel route (e.g., ahead by some threshold distance in a direction of travel on the same road on which the vehicle is moving). If so, aspects include smart vehicle controller 540 automatically performing various preventative and/or corrective actions based upon how the relevance of the identified anomaly is determined. For example, smart vehicle controller 540 may issue a visual and/or audible alert via driving control system 550, calculate and display a new travel route via driving control system 550 that avoids the location of the identified event, etc.

In some aspects, the preventative and/or corrective actions may be issued only when it is determined that an identified anomaly is relevant, and is otherwise not issued. For example, aspects include an identified anomaly that is not along a current route for the vehicle in which smart vehicle control system 500 is implemented not causing an alarm to be sounded and/or the route to be adjusted, even if the location of the anomaly is otherwise nearby. In this way, the preventive or corrective action may alleviate or avoid a negative impact of the abnormal travel condition on the driver and/or the vehicle in which smart vehicle control system 500 is implemented to facilitate safer or more efficient vehicle travel. Additional details of the preventive or corrective action that may be facilitated by smart vehicle control system 500 (or another suitable computing device or system) are further discussed below with reference to FIGS. 6-8.

As noted above, in an aspect, a smart train controller or smart train control system may include similar features as smart vehicle control system 500 and may be integrated as part of a train (e.g., train 210). Thus, for instance, a smart train control system may include a smart train controller, train sensors, a communication unit, a sensor array, and/or a train operation control system configured to perform functions similar to those discussed with reference to smart vehicle control system 500, but in the context of a train (e.g., train 210) and train telematics data and/or other suitable data as discussed herein.

Exemplary Railroad Crossing Embodiments

Figure 6:
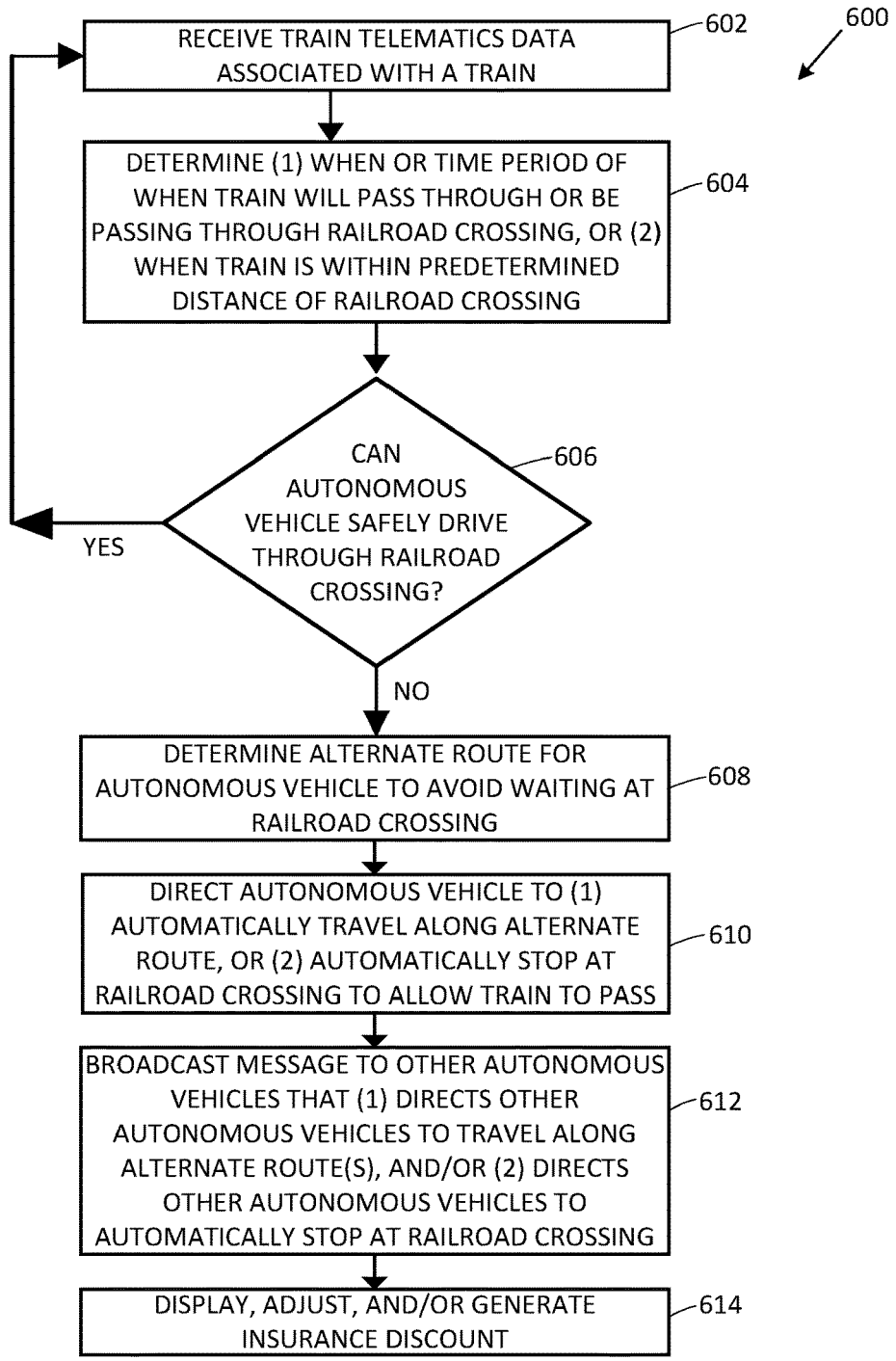
FIG. 6 illustrates an exemplary computer-implemented method 600 of using train telematics data to reduce risk of accidents in accordance with an exemplary aspect of the present disclosure.

FIG. 6 illustrates an exemplary method 600 of using train telematics data to reduce risk of accidents. In the present aspect, the method 600 may be implemented by any suitable computing device (e.g., mobile computing devices 204.1 and/or 204.2, mobile computing device 212, external computing device 206, vehicles 202.1 and/or 202.2, train 210, and/or infrastructure component 208, as shown in FIG. 2). In one aspect, the method 600 may be performed by one or more processors, applications, and/or routines, such as any suitable portion of controller 340, software applications 344, and/or software routines 352, for example, as shown in FIG. 3.

The method 600 may include receiving train telematics data associated with a train (block 602). The train telematics data may be received via at least one of one or more autonomous vehicle processors (e.g., one or more processors of the mobile computing device 204.1 where the vehicle 202.1 is an autonomous vehicle, one or more processors of a smart vehicle controller where the vehicle 202.1 is an autonomous vehicle, etc.) or associated transceivers (e.g., one or more transceivers of the mobile computing device 204.1, one or more transceivers of a smart vehicle controller of the vehicle 202.1, etc.) (block 602). The train telematics data may be received via wireless communication or data transmission directly from a train transceiver (e.g., of train 210) or indirectly from a railroad crossing (e.g., a smart railroad crossing that may be an implementation of infrastructure component 208) (block 602). The train telematics data may include at least one of GPS location data, speed data, route data, heading data, acceleration data, or track data associated with train 210 (block 602).

In one aspect, the train telematics data may be received by receiving a broadcast via a mobile device Telematics App (e.g., alert notification application 346), which may listen for a telematics or other broadcast (block 602). When a telematics broadcast is detected, the train telematics data may be received by, for example, mobile computing device 204.1 and downloaded or otherwise stored in a memory (block 602). This may include the mobile computing device 204.1 receiving the train telematics data from one or more of, for example, mobile computing device 204.2, a dedicated train device such as that discussed herein, and/or infrastructure component 208 (which, again, may be implemented as a smart railroad crossing) (block 602).

In another aspect, the received train telematics data may additionally or alternatively include at least one of a timestamp, one or more sensor metrics indicative of braking motion of train 210, one or more sensor metrics indicative of acceleration motion of train 210, one or more sensor metrics indicative of cornering motion of train 210, or one or more sensor metrics indicative of a direction of train 210 (block 602).

In yet another aspect, the received train telematics data may additionally or alternatively include at least one of the speed data associated with train 210, the acceleration data associated with train 210, deceleration data associated with train 210, the GPS location data associated with train 210, or lane data associated with train 210 (block 602). The lane data associated with train 210 may, in some aspects, be indicative of a lane that an autonomous vehicle (e.g., vehicle 202.1) is traveling in so as to facilitate a determination of whether the autonomous vehicle can safely drive through a railroad crossing when the train 210 is passing through, will be passing through, etc., the railroad crossing, as further discussed below (block 602).

In still another aspect, the received train telematics data may additionally or alternatively include at least one of time data associated with train 210, braking data associated with train 210, left and/or right turn data associated with train 210, heading data associated with train 210, GPS speed data associated with train 210, GPS latitude and longitude data associated with train 210, gyroscope data associated with train 210, battery level data associated with train 210, or telephone usage data associated with train 210 (block 602).

As noted above, in various aspects, examples of the received train telematics data as described herein may be data of train 210 itself and/or data of an autonomous vehicle (e.g., vehicle 202.1) (block 602). For instance, the aforementioned braking data, left and/or right turn data, heading data, GPS speed data, GPS latitude and longitude data, gyroscope data, battery level data, and telephone usage data, among other examples, may be data of train 210 itself and/or data of an autonomous vehicle (block 602). It should be appreciated that when such data is data of an autonomous vehicle, such data may be regarded as being associated with train 210 because of the relevance of such data in determining, for example, whether the autonomous vehicle can safely drive through a railroad crossing, as further discussed below (block 602).

The method 600 may include determining (e.g., via the one or more autonomous vehicle processors) (1) when, or a time period of when, train 210 will pass through or be passing through a railroad crossing, or (2) when train 210 is within a predetermined distance of the railroad crossing (block 604). This determination may be based upon the train telematics data, and the railroad crossing referred to in the determination may be the same railroad crossing from which the train telematics data may be indirectly received (block 604). Alternatively, the railroad crossing may be another railroad crossing, such as a railroad crossing adjacent to the railroad crossing from which the train telematics data may be indirectly received (e.g., the other railroad crossing may be a next railroad crossing along a route traveled by train 210) (block 604).

In one aspect, the determination described with respect to block 604 may be based upon at least one of the GPS location data associated with train 210, the speed data associated with train 210, the heading data associated with train 210, the route data associated with train 210, or the track data associated with train 210 (block 604). Additionally or alternatively, the determination described with respect to block 604 may be based upon comparison via the one or more autonomous vehicle processors of (i) at least one of the GPS location data associated with train 210, the speed data associated with train 210, the heading data associated with train 210, the route data associated with train 210, or the track data associated with train 210 with (ii) a GPS location of the railroad crossing or the other railroad crossing and a current time (block 604).

In one aspect, train 210 may have a dedicated device installed or otherwise mounted in train 210, which may include a transceiver, a controller, a GPS unit, a navigation map database, etc. (block 604). By comparing the train's current geographic location to railroad crossing locations stored in a navigation map database, the controller may determine that train 210 is approaching, or within a given threshold distance, of the railroad crossing (block 604). In such a case, the dedicated device may generate and broadcast train telematics data, as previously discussed above with reference to the mobile computing devices 204.1-204.N of FIG. 2, so that the determination described with respect to block 604 may be performed (block 604).

To provide another example, aspects include alert notification application 346 facilitating a mobile computing device located on train 210 (e.g., mobile computing device 212, which may be carried by train personnel) determining when train 210 is within a threshold distance of the railroad crossing, and generating and broadcasting the train telematics data upon this condition being satisfied so that the determination described with respect to block 604 may be performed (block 604).

Additionally or alternatively, a smart railroad crossing may detect that train 210 is approaching, such as via wireless communication with the dedicated device and/or via wireless communication with the mobile computing device located on train 210. As discussed above with reference to FIG. 2, the smart railroad crossing may include, for instance, any suitable combination of components to facilitate this functionality. For example, the smart railroad crossing may include a processor, a transceiver, a memory, and/or other suitable components. The smart railroad crossing may broadcast a signal indicating the arrival of train 210 at the crossing (e.g., once train 210 is within a predetermined or threshold distance of the railroad crossing) to vehicles or mobile devices approaching, or within proximity of, the railroad crossing so that the determination described with respect to block 604 may be performed (block 604).

Thus, in various aspects, the method 600 may include broadcasting train telematics, route, and/or destination data, for example, which may be received by one or more other mobile computing devices in the vicinity of the railroad crossing so that the determination described with respect to block 604 may be performed (block 604).

The method 600 may include determining (e.g., via the one or more autonomous vehicle processors) whether the autonomous vehicle can safely drive through the railroad crossing (block 606). For instance, this determination may be or include a determination of whether the autonomous vehicle can safely drive through the railroad crossing before a crossing signal is sounded, and/or whether the autonomous vehicle can safely drive through the railroad crossing without a collision with train 210 or without train 210 coming within a threshold distance of the railroad crossing, etc. (block 606). The determination described with respect to block 606 may be performed by way of the anomalous condition detection routine 358 based upon any suitable data and/or other factors, such as based upon a suitable comparison of the train telematics data or a portion thereof with, for example, geographic location data and/or other telematics data of the autonomous vehicle (e.g., vehicle 202.1) (block 606). The geographic location data and/or other telematics data of the autonomous vehicle may be determined as discussed above, such as by executing instructions of telematics collection routine 354 and/or geographic location determination routine 356 (block 606). For instance, the mobile device Telematics App may compare the train telematics data with a speed of the autonomous vehicle, and/or with the autonomous vehicle's route, location, etc. (block 606).

If it is determined that the autonomous vehicle can safely drive through the railroad crossing, method 600 may revert to the receipt of train telematics data associated with train 210 (block 602). If it is determined that the autonomous vehicle cannot safely drive through the railroad crossing, method 600 may continue (block 608).

The method 600 may include determining an alternate route for the autonomous vehicle to take to avoid waiting at the railroad crossing (which, as noted above, may be the same railroad crossing from which the train telematics data may be indirectly received or may be another railroad crossing) (block 608). In this manner, train 210 may be allowed to pass through the railroad crossing (block 608). This determination may be made via the one or more autonomous vehicle processors based upon telematics data and/or geographic location data of the autonomous vehicle and/or train 210, which may be collected, broadcast, etc. as described above (block 608). This determination may also or alternatively be made using other data, such as map data stored by, for example, mobile computing device 204.1 (block 608). For instance, the one or more autonomous vehicle processors may use telematics data and/or geographic location data of the autonomous vehicle and/or train 210, and map data, to determine an alternate route that follows known roads toward a destination of the autonomous vehicle and that will, based upon the telematics data and/or geographic location data, avoid a train-vehicle collision (block 608).

The method 600 may include directing (e.g., via the one or more autonomous vehicle processors) the autonomous vehicle to (1) automatically travel along the alternate route, or (2) automatically stop at the railroad crossing to allow train 210 to pass (block 610). For instance, if the one or more autonomous vehicle processors are unable to determine a suitable alternate route using the telematics data and/or geographic location data, and map data, as described above with respect to block 608 (e.g., if the acts described with respect to block 608 are unable to be performed), then the autonomous vehicle may be directed to automatically stop at the railroad crossing (block 610). The one or more autonomous vehicle processors may be unable to determine a suitable alternate route if, for instance, an alternate route is determined but would take the autonomous vehicle more time to travel along than the autonomous vehicle would need to wait at the railroad crossing for the train to pass (block 610). In another instance, the one or more autonomous vehicle processors may be unable to determine a suitable alternate route if the alternate route includes one or more roads that are more than a threshold distance from the original route, etc. (block 610).

When the autonomous vehicle is directed to automatically travel along the alternate route, the alternate route may be displayed on a display of a mobile computing device of the autonomous vehicle (e.g., display 316 of mobile computing device 204.1) (block 610). In any event, it should be appreciated that performance of one or more of the acts described herein may allow train 210 to pass unimpeded and may facilitate avoidance of train-vehicle collisions and safer train and vehicle travel (block 610).

The method 600 may include broadcasting (e.g., via the one or more autonomous vehicle processors and/or the one or more associated transceivers) a message to other autonomous vehicles that (1) directs the other autonomous vehicles to travel along at least one alternate route, and/or (2) directs the other autonomous vehicles to automatically stop at the railroad crossing (block 612). For each autonomous vehicle, the message may be either to travel along an alternate route that completely avoids the railroad crossing or to automatically stop at the railroad crossing; that is, one or more autonomous vehicles may receive a message to travel along an alternate route(s) and one or more autonomous vehicles may receive a message to automatically stop at the railroad crossing (block 612). Moreover, for each autonomous vehicle, and as discussed above, a message to automatically stop at the railroad crossing may be a message to automatically stop at the same railroad crossing from which the train telematics data may be indirectly received or another railroad crossing (block 612). In one aspect, a message to automatically stop at the railroad crossing may be a message to automatically stop at the railroad crossing during a predetermined time period to allow train 210 to pass unimpeded to facilitate avoidance of train-vehicle collisions (block 612).

The method 600 may include at least one of displaying, adjusting, or generating an insurance discount for vehicles (e.g., autonomous vehicles) having risk mitigation or prevention functionality such as that described herein (e.g., functionality associated with receiving a wireless communication broadcast including the train telematics data, analyzing the train telematics data, and directing corrective actions based upon the train telematics data as described with respect to the method 600) (block 614). The at least one of the displaying, adjusting, or generating an insurance discount may be performed via, for example, the one or more autonomous vehicle processors and/or an insurance provider remote server (block 614). Moreover, such acts may be performed and results may be displayed or otherwise communicated via, for example, an insurance provider remote server and/or a mobile computing device, as also described hereinabove (block 614). In some aspects, the insurance discount may be time or mileage usage-based based upon an amount of usage of the risk mitigation or prevention functionality, as also described hereinabove (block 614). Moreover, in some aspects, an insurance provider remote server (implementations of which are discussed above) may adjust an insurance premium or discount by receiving telematics data from an insured mobile device, which telematics data may include an indication of a level of usage of the alert, recommendation, and/or other functionality discussed herein (block 614).

The method 600 may include additional, less, or alternate actions, including those discussed elsewhere herein, and/or may be implemented via one or more local or remote processors (e.g., mobile device, train, EMS vehicle, destination vehicle, and/or remote server processors), or via computer-executable instructions stored on non-transitory computer-readable medium or media.

Figure 7:
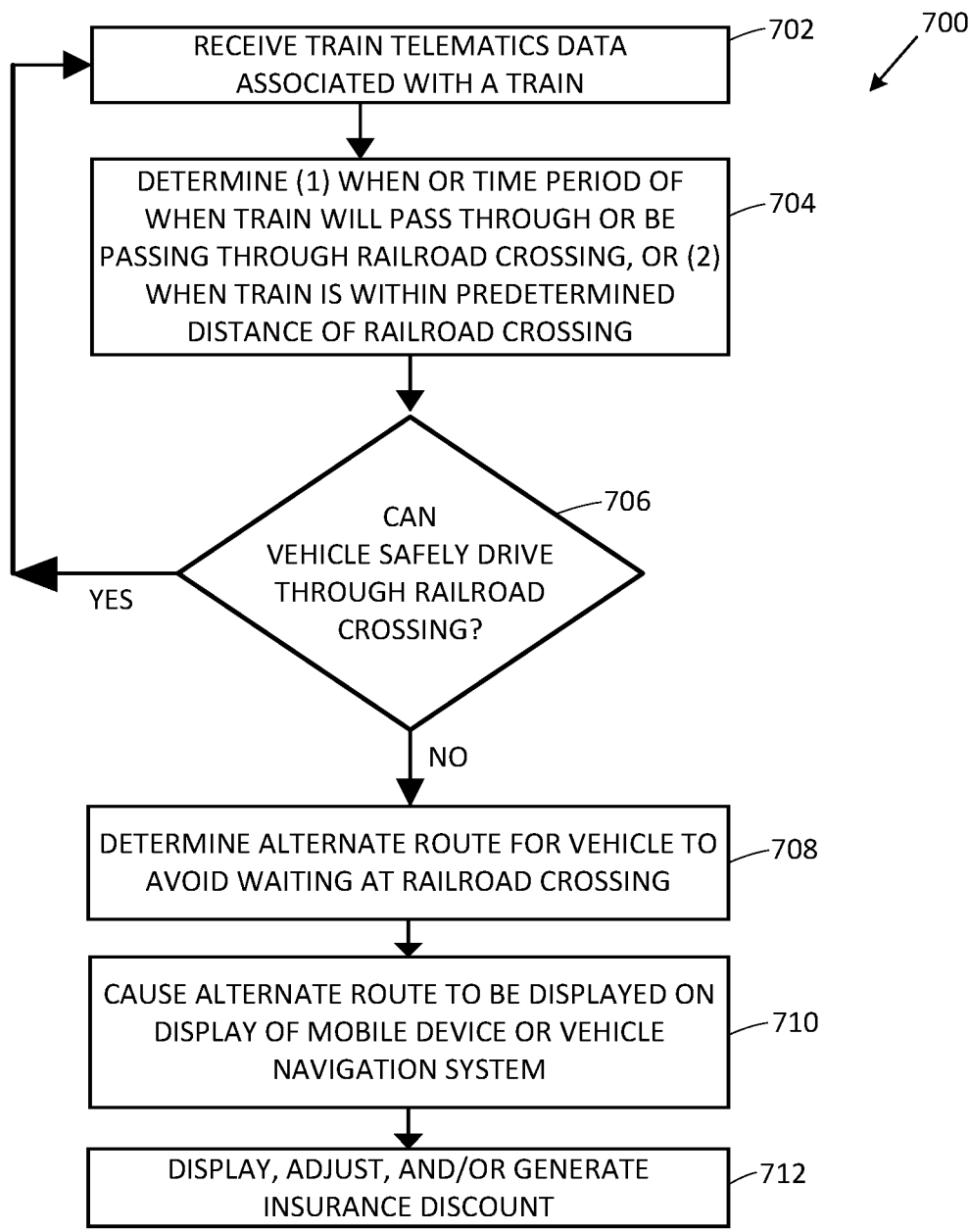
FIG. 7 illustrates an exemplary computer-implemented method 700 of using train telematics data to reduce risk of accidents via a mobile device traveling within a vehicle in accordance with an exemplary aspect of the present disclosure.

FIG. 7 illustrates an exemplary method 700 of using train telematics data to reduce risk of accidents via a mobile device traveling within a vehicle. In the present aspect, the method 700 may be implemented by any suitable computing device (e.g., mobile computing devices 204.1 and/or 204.2, mobile computing device 212, external computing device 206, vehicles 202.1 and/or 202.2, train 210, and/or infrastructure component 208, as shown in FIG. 2). In one aspect, the method 700 may be performed by one or more processors, applications, and/or routines, such as any suitable portion of controller 340, software applications 344, and/or software routines 352, for example, as shown in FIG. 3.

The method 700 may include receiving train telematics data associated with a train (block 702). The train telematics data may be received via wireless communication or data transmission (block 702). Moreover, the train telematics data may be received via at least one of one or more processors of a mobile device (e.g., mobile computing device 204.1) traveling within a vehicle (e.g., vehicle 202.1) or one or more associated transceivers (e.g., one or more transceivers of mobile computing device 204.1) (block 702). Aside from the inclusion of such aspects in which the train telematics data may be received by the at least one of the one or more processors of the mobile device traveling within the vehicle (which may be, but need not be, an autonomous vehicle) or the one or more associated transceivers, the acts described with respect to block 702 may be similar to those described with respect to block 602. Thus, the train telematics data may be received directly from a train transceiver (e.g., of train 210) or indirectly from a railroad crossing (e.g., a smart railroad crossing that may be an implementation of infrastructure component 208) (block 702). The train telematics data may include data such as example types of data described with respect to block 602. Moreover, the train telematics data may be received by receiving a broadcast via a Telematics App of the mobile device, as also described more fully with respect to block 602.

The method 700 may include determining (e.g., via the one or more processors of the mobile device) (1) when, or a time period of when, train 210 will pass through or be passing through a railroad crossing, or (2) when train 210 is within a predetermined distance of the railroad crossing (block 704). This determination may be based upon the train telematics data and, aside from being performed by, for example, one or more processors of the mobile device which need not be in an autonomous vehicle, may be performed in the manner described with respect to block 604. Similarly, a dedicated device installed or otherwise mounted in train 210 may generate and broadcast the train telematics data as described with respect to block 604; alert notification application 346 may facilitate such generation and broadcasting as described with respect to block 604; a smart railroad crossing may broadcast a signal indicating the arrival of train 210 at the railroad crossing as described with respect to block 604; etc. (block 704).

Thus, in various aspects, the method 700 may include broadcasting train telematics, route, and/or destination data, for example, which may be received by one or more other mobile computing devices in the vicinity of the railroad crossing so that the determination described with respect to block 704 may be performed (block 704).

The method 700 may include determining (e.g., via the one or more processors of the mobile device) whether the vehicle can safely drive through the railroad crossing (block 706). For instance, this determination may be or include a determination of whether the vehicle can safely drive through the railroad crossing before a crossing signal is sounded, and/or whether the vehicle can safely drive through the railroad crossing without a collision with train 210 or without train 210 coming within a threshold distance of the railroad crossing, etc. (block 706). The determination described with respect to block 706 may be performed, for example, in one of the example ways described with respect to block 606.

If it is determined that the vehicle can safely drive through the railroad crossing, method 700 may revert to the receipt of train telematics data associated with train 210 (block 702). If it is determined that the vehicle cannot safely drive through the railroad crossing, method 700 may continue (block 708).

The method 700 may include determining an alternate route for the vehicle to take to avoid waiting at the railroad crossing (which, as with the method 600, may be the same railroad crossing from which the train telematics data may be indirectly received or may be another railroad crossing) (block 708). In this manner, train 210 may be allowed to pass through the railroad crossing (block 708). This determination may be made, for instance, in one of the example ways described with respect to block 608.

The method 700 may include causing (e.g., via the one or more processors of the mobile device) the alternate route to be displayed on a display of the mobile device (e.g., display 316 of mobile computing device 204.1) or a vehicle navigation system (e.g., a vehicle navigation system of vehicle 202.1) (block 710). It should be appreciated that performance of one or more of the acts described herein may allow train 210 to pass unimpeded and may facilitate avoidance of train-vehicle collisions and safer train and vehicle travel (block 710).

The method 700 may include at least one of displaying, adjusting, or generating an insurance discount for vehicles having risk mitigation or prevention functionality such as that described herein (e.g., functionality associated with receiving a wireless communication broadcast including the train telematics data, analyzing the train telematics data, and directing corrective actions based upon the train telematics data as described with respect to the method 700) (block 712). The at least one of the displaying, adjusting, or generating an insurance discount may be performed via, for example, the one or more mobile processors of the mobile device and/or an insurance provider remote server (block 712). In some aspects, the insurance discount may be time or mileage usage-based based upon an amount of usage of the risk mitigation or prevention functionality, and/or an insurance provider remote server may adjust an insurance premium or discount by receiving telematics data from an insured mobile device, as described above with respect to block 614.

The method 700 may include additional, less, or alternate actions, including those discussed elsewhere herein, and/or may be implemented via one or more local or remote processors (e.g., mobile device, train, EMS vehicle, destination vehicle, and/or remote server processors), or via computer-executable instructions stored on non-transitory computer-readable medium or media.

Figure 8:
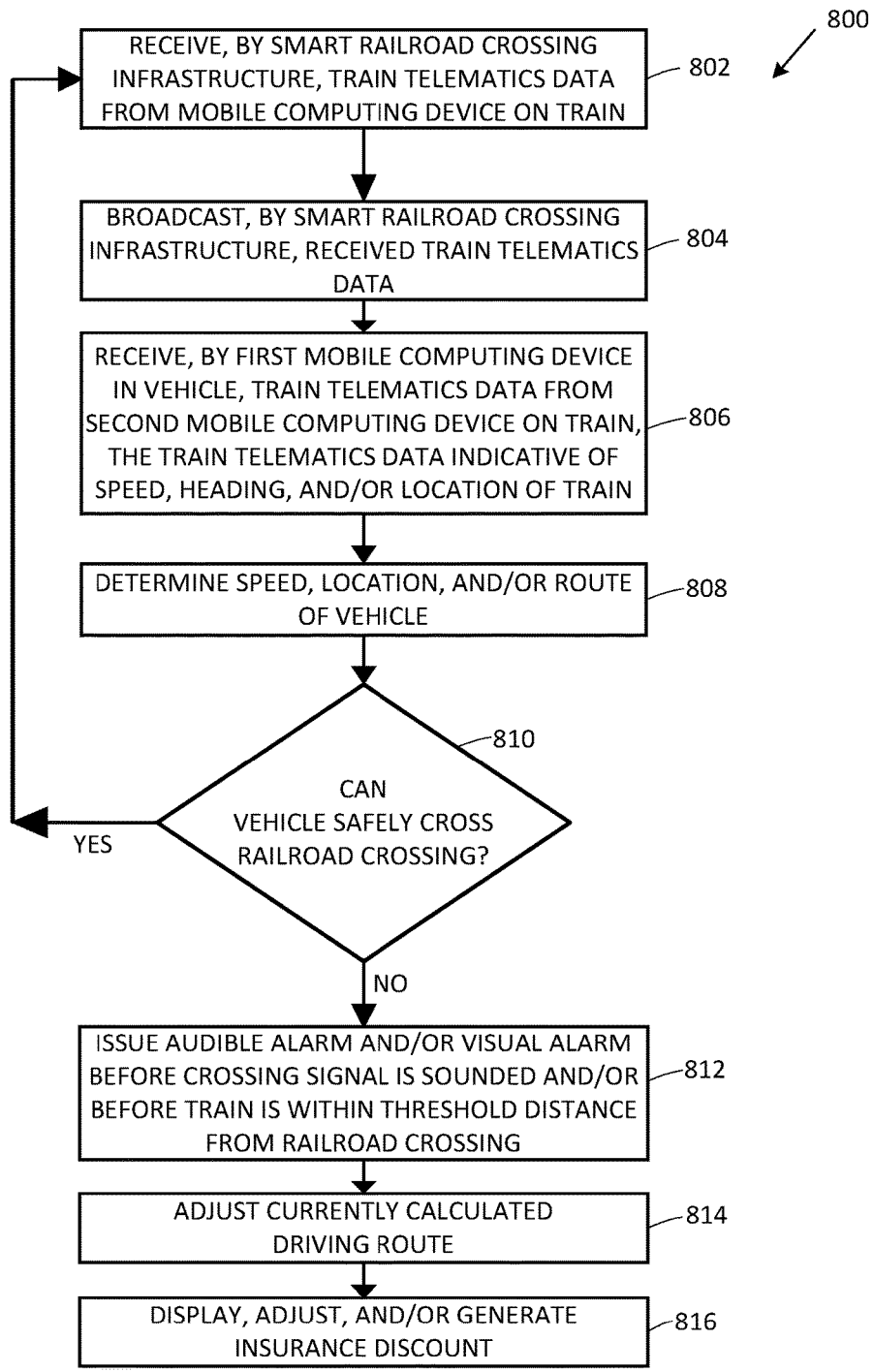
FIG. 8 illustrates an exemplary computer-implemented method 800 of utilizing train telematics data in accordance with an exemplary aspect of the present disclosure.

FIG. 8 illustrates an exemplary method 800 of utilizing train telematics data. In the present aspect, the method 800 may be implemented by any suitable computing device(s) (e.g., mobile computing devices 204.1 and/or 204.2, mobile computing device 212, external computing device 206, vehicles 202.1 and/or 202.2, train 210, and/or infrastructure component 208, as shown in FIG. 2). In one aspect, the method 800 may be performed by one or more processors, applications, and/or routines, such as any suitable portion of controller 340, software applications 344, and/or software routines 352, for example, as shown in FIG. 3.

The method 800 may include receiving, by a smart railroad crossing infrastructure (e.g., an implementation of infrastructure component 208), train telematics data from a mobile computing device located on (or otherwise associated with) a train (e.g., mobile computing device 212 located on or otherwise associated with train 210) (block 802). Receipt of train telematics data by a smart railroad crossing infrastructure is discussed in further detail above with respect to, for example, FIG. 6.

The method 800 may include broadcasting, by the smart railroad crossing infrastructure, the train telematics data received from the mobile computing device (block 804). Broadcasting of train telematics data by a smart railroad crossing infrastructure is discussed in further detail above with respect to, for example, FIG. 6.

The method 800 may include receiving, by a first mobile computing device located in a vehicle (e.g., mobile computing device 204.1 located in vehicle 202.1), the train telematics data from a second mobile computing device located on train 210 (block 806). The second mobile computing device may be the mobile computing device described above with respect to blocks 802 and 804 (e.g., mobile computing device 212) (block 806). In some aspects, the acts described with respect to blocks 802 and 804 may not be performed, and the method 800 may begin with the acts described with respect to block 806. The train telematics data may include information indicative of at least one of a speed, a heading, or a location of train 210 (block 806).

The method 800 may include determining, by the first mobile computing device, at least one of a speed, a location, or a route of the vehicle (block 808). This determination may be made by, for example, a Telematics App of the first mobile computing device, with example functionality of a Telematics App being further discussed above (block 808).

The method 800 may include determining, by the first mobile computing device, whether the vehicle can safely cross a railroad crossing (which may be the smart railroad crossing referred to above with respect to blocks 802 and 804 or a different railroad crossing) (block 810). For instance, this determination may be performed by the first mobile computing device based upon a comparison between (1) the at least one of the speed, the location, or the route of the vehicle, and (2) the at least one of the speed, the heading, or the location of train 210 as derived from the train telematics data (block 810). In one aspect, the determination of whether the vehicle can safely cross the railroad crossing may be a determination of whether the vehicle will be able to cross the railroad crossing before at least one of (1) a crossing signal associated with the railroad crossing is sounded (e.g., indicating that one or more gates associated with railroad crossing are closing or about to close), or (2) train 210 is within a threshold distance from the railroad crossing (block 810). Examples of determining train location relative to a railroad crossing are further discussed above.

If it is determined that the vehicle can safely cross the railroad crossing, method 800 may revert to the acts described with respect to block 802 (or to the acts described with respect to block 806, for example, in aspects where the acts described with respect to blocks 802 and 804, for example, are not performed). If it is determined that the vehicle cannot safely cross the railroad crossing, method 800 may continue (block 812).

The method 800 may include issuing (e.g., by the first mobile computing device) at least one of an audible alarm or a visual alarm before the at least one of (1) the crossing signal is sounded or (2) train 210 is within the threshold distance from the railroad crossing (block 812). For instance, an audible alarm may be issued via speaker/microphone 322, and/or a visual alarm may be issued via display 316 (block 812).

The method 800 may include adjusting, by the first mobile computing device, a currently calculated driving route (block 814). The adjusted route may be determined, for example, in the manner described above for determining an alternate route (e.g., as described with respect to block 608) (block 814). The adjusted route may avoid the railroad crossing (block 814).

The method 800 may include at least one of displaying, adjusting, or generating an insurance discount for vehicles having risk mitigation or prevention functionality such as that described herein (e.g., functionality associated with the first mobile computing device as described herein) (block 816). The at least one of the displaying, adjusting, or generating an insurance discount may be performed via, for example, one or more processors of the first mobile computing device and/or an insurance provider remote server (block 816). In some aspects, the insurance discount may be time or mileage usage-based based upon an amount of usage of the risk mitigation or prevention functionality, and/or an insurance provider remote server may adjust an insurance premium or discount by receiving telematics data from an insured mobile device, such as the first mobile computing device, as described above with respect to block 614.

The method 800 may include additional, less, or alternate actions, including those discussed elsewhere herein, and/or may be implemented via one or more local or remote processors (e.g., mobile device, train, EMS vehicle, destination vehicle, and/or remote server processors), or via computer-executable instructions stored on non-transitory computer-readable medium or media.

Train Telematics/Smart Train Controller

In one aspect, a computer-implemented method of using train telematics data to reduce risk of collisions may be provided. The method may include (1) generating, via one or more processors (such as a smart train controller) or a Telematics App, train telematics data associated with movement of a train, the train telematics data including GPS location, speed, route, heading, acceleration, and/or track data; (2) determining, via the one or more processors, when the train is within a predetermined distance of a railroad crossing based upon the train telematics data; and/or (3) when the train is determined to be within the predetermined distance of the railroad crossing and moving toward the railroad crossing, broadcasting via the one or more processors (such as via wireless communication or data transmission) an alert or the train telematics data (i) directly or indirectly to nearby autonomous vehicles to facilitate the autonomous vehicles avoiding or stopping at the railroad crossing, or (ii) directly or indirectly to smart railroad crossing infrastructure (e.g., a smart railroad crossing) to allow automatic gate closing or other visual alerts at the railroad crossing to avoid train-vehicle collisions.

In another aspect, a computer-implemented method of using train telematics data to reduce risk of collision may be provided. The method may include (1) generating, via one or more processors (such as a smart train controller) or a Telematics App, telematics data associated with movement of a train, the train telematics data including GPS location, speed, route, heading, acceleration, and/or track data; (2) determining, via the one or more processors, a time period of when the train will be passing through a railroad crossing based upon the train telematics data (such as based upon train GPS location, speed, heading, route, and/or track information, and/or comparison with a GPS location of the railroad crossing); and/or (3) when it is determined that the train is within the predetermined distance of the railroad crossing and moving toward the railroad crossing, broadcasting via the one or more processors (such as via wireless communication or data transmission): (a) the time period of when the train will be passing through the railroad crossing, (b) an alert, and/or (c) the train telematics data (i) directly or indirectly to autonomous vehicles to facilitate the autonomous vehicles automatically avoiding (such as re-routing themselves based upon a current destination and the train telematics data) and/or automatically stopping at the railroad crossing, or (ii) directly or indirectly to smart railroad crossing infrastructure to allow automatic gate closing or generation of other visual alerts at the smart railroad crossing to avoid train-vehicle collisions.

The foregoing methods may include additional, less, or alternate actions, including those discussed elsewhere herein. For instance, the telematics data may include data selected from one or more of, and not limited to all of: a timestamp; one or more sensor metrics indicative of braking motion of the train; one or more sensor metrics indicative of acceleration motion of the train; one or more sensor metrics indicative of cornering motion of the train; and one or more sensor metrics indicative of a direction of the train. The telematics data may include speed, acceleration, deceleration, GPS location, lane information, and/or other data of, or associated with, the train. Additionally or alternatively, the telematics data may include one or more of, and not limited to all of: time, braking, acceleration, left turn, right turn, heading, GPS (Global Positioning System) speed, GPS latitude and longitude, gyroscope, battery level, and/or telephone usage information or data of, or associated with, the train.

Train Telematics/Destination Device

In one aspect, a computer-implemented method of using train telematics data to reduce risk of collisions may be provided. The method may include (1) receiving, via one or more autonomous vehicle processors (and/or associated transceivers), such as via wireless communication or data transmission, train telematics data associated with movement of a train directly from a train transceiver or indirectly from a smart railroad crossing, the train telematics data including GPS location, speed, route, heading, acceleration, and/or track data; (2) determining, via the one or more autonomous vehicle processors, when, or a time period of when, the train will pass through (or be passing through) a railroad crossing based upon the train telematics data (such as based upon train GPS location, speed, heading, route, and/or track information, and/or comparison with a GPS location of the railroad crossing and a current time); (3) determining, via the one or more autonomous vehicle processors, an alternate route for the autonomous vehicle to take to avoid waiting at the railroad crossing to allow for the train to pass; and/or (4) directing, via the one or more autonomous vehicle processors, the autonomous vehicle to automatically travel along the alternate route, or alternatively directing the autonomous vehicle to automatically stop at the railroad crossing to allow the train to pass unimpeded and to facilitate avoidance of train-vehicle collisions.

The method may include additional, less, or alternate actions, including those discussed elsewhere herein. For instance, the telematics data may include data selected from one or more of, and not limited to all of: a timestamp; one or more sensor metrics indicative of braking motion of the train; one or more sensor metrics indicative of acceleration motion of the train; one or more sensor metrics indicative of cornering motion of the train; and one or more sensor metrics indicative of a direction of the train. The telematics data may include speed, acceleration, deceleration, GPS location, lane information, and/or other data of, or associated with, the train. Additionally or alternatively, the telematics data may include one or more of, and not limited to all of: time, braking, acceleration, left turn, right turn, heading, GPS (Global Positioning System) speed, GPS latitude and longitude, gyroscope, battery level, and/or telephone usage information or data of, or associated with, the train.

The method may include adjusting or generating an insurance discount for vehicles having the risk mitigation or prevention functionality associated with receiving a wireless communication broadcast including train telematics data, analyzing the train telematics data, and directing corrective actions based upon the train telematics data.

Train Telematics/Smart Railroad Crossing

In one aspect, a computer-implemented method of using train telematics data to reduce risk of collision may be provided. The method may include (1) receiving, via one or more smart railroad crossing processors (and/or associated transceivers), such as via wireless communication or data transmission, train telematics data associated with movement of a train directly from a train transceiver or indirectly from a smart railroad crossing, the train telematics data including GPS location, speed, route, heading, acceleration, and/or track data; (2) determining, via the one or more processors, when the train will pass through (or a time period of when the train will be passing through) a railroad crossing based upon the train telematics data (such as based upon comparing train GPS location, speed, route, heading, and/or track information with a GPS location of the railroad crossing and a current time); (3) determining, via the one or more processors, an alternate route(s) for an autonomous vehicle(s) to take to avoid waiting at the railroad crossing while the train is passing through; and/or (4) broadcasting, via the one or more processors (and/or associated transceivers), a message to an autonomous vehicle(s) directing the autonomous vehicles to travel along an alternate route that completely avoids the railroad crossing, or alternatively a message directing an autonomous vehicle(s) to automatically stop at the railroad crossing during a predetermined time period to allow the train to pass unimpeded to facilitate avoidance of train-vehicle collisions.

The method may include additional, less, or alternate actions, including those discussed elsewhere herein. For instance, the telematics data may include data selected from one or more of, and not limited to all of: a timestamp; one or more sensor metrics indicative of braking motion of the train; one or more sensor metrics indicative of acceleration motion of the train; one or more sensor metrics indicative of cornering motion of the train; and one or more sensor metrics indicative of a direction of the train. The telematics data may include speed, acceleration, deceleration, GPS location, lane information, and/or other data of, or associated with, the train. Additionally or alternatively, the telematics data may include one or more of, and not limited to all of: time, braking, acceleration, left turn, right turn, heading, GPS (Global Positioning System) speed, GPS latitude and longitude, gyroscope, battery level, and/or telephone usage information or data of, or associated with, the train.

The method may include adjusting or generating an insurance discount for vehicles having the risk mitigation or prevention functionality associated with receiving a wireless communication broadcast including train telematics data, analyzing the train telematics data, and directing corrective actions based upon the train telematics data.

Exemplary System Configured to Use Train Telematics Data

As depicted by, and discussed in relation to, FIGS. 1, 2, and 6, for example, in one aspect, a computer system configured to use train telematics data to reduce risk of accidents may be provided. The computer system may include at least one of one or more processors or associated transceivers mounted on or within an autonomous or semi-autonomous vehicle, the at least one of the one or more processors or the associated transceivers configured to: (1) receive, via wireless communication or data transmission, train telematics data associated with a train directly from a train transceiver or indirectly from a railroad crossing, the train telematics data including at least one of GPS location, speed, route, heading, acceleration, or track data; (2) determine, based upon the train telematics data, (a) when, or a time period of when, the train will pass through or be passing through the railroad crossing or another railroad crossing, or (b) when the train is within a predetermined distance of the railroad crossing or the other railroad crossing; (3) determine an alternate route for the autonomous vehicle to take to avoid waiting at the railroad crossing or the other railroad crossing to allow for the train to pass; and/or (4) direct the autonomous vehicle to one of (a) automatically travel along the alternate route, or (b) automatically stop at the railroad crossing or the other railroad crossing to allow the train to pass unimpeded and to facilitate avoidance of train-vehicle collisions and safer train and vehicle travel. The at least one of the one or more processors or the associated transceivers may be configured to determine when, or the time period of when, the train will pass through or be passing through the railroad crossing or the other railroad crossing based upon at least one of (a) at least one of the GPS location, the speed, the heading, the route, or the track data, or (b) comparison via the one or more processors of the at least one of the GPS location, the speed, the heading, the route, or the track data with a GPS location of the railroad crossing or the other railroad crossing and a current time.

The computer system may be further configured to at least one of display, adjust, or generate an insurance discount for vehicles having risk mitigation or prevention functionality associated with receiving a wireless communication broadcast including the train telematics data, analyzing the train telematics data, and directing corrective actions based upon the train telematics data, and/or a time or mileage usage-based insurance discount for vehicles based upon an amount of usage of risk mitigation or prevention functionality associated with receiving a wireless communication broadcast including the train telematics data, analyzing the train telematics data, and directing corrective actions based upon the train telematics data. The computer system may be configured with additional, less, or alternate functionality, including that discussed elsewhere herein.

For instance, the train telematics data may include data selected from one or more of, and not limited to all of: a timestamp; one or more sensor metrics indicative of braking motion of the train; one or more sensor metrics indicative of acceleration motion of the train; one or more sensor metrics indicative of cornering motion of the train; and one or more sensor metrics indicative of a direction of the train. The train telematics data may include at least one of speed, acceleration, deceleration, GPS location, lane information, and/or other data of, or associated with, the train. The telematics data may include one or more of, and not limited to all of: time, braking, acceleration, left turn, right turn, heading, GPS (Global Positioning System) speed, GPS latitude and longitude, gyroscope, battery level, and/or telephone usage information or data of, or associated with, the train, and/or other telematics and digital data, including that discussed elsewhere herein.

Exemplary Method of Using Train Telematics Data

As depicted by, and discussed in relation to, FIGS. 1, 2, and 6, for example, in another aspect, a computer-implemented method of using train telematics data to reduce risk of accidents may be provided. The method may include (1) receiving, via at least one of one or more autonomous (or semi-autonomous) vehicle processors or associated transceivers via wireless communication or data transmission, the train telematics data associated with a train directly from a train transceiver or indirectly from a railroad crossing, the train telematics data including at least one of GPS location, speed, route, heading, acceleration, or track data; (2) determining, via the one or more autonomous vehicle processors based upon the train telematics data, (1) when, or a time period of when, the train will pass through or be passing through the railroad crossing or another railroad crossing, or (2) when the train is within a predetermined distance of the railroad crossing or the other railroad crossing; (3) determining, via the one or more autonomous vehicle processors, an alternate route for the autonomous vehicle to take to avoid waiting at the railroad crossing or the other railroad crossing to allow for the train to pass; and/or (4) directing, via the one or more autonomous vehicle processors, the autonomous vehicle to one of (1) automatically travel along the alternate route, or (2) automatically stop at the railroad crossing or the other railroad crossing to allow the train to pass unimpeded and to facilitate avoidance of train-vehicle collisions and safer train and vehicle travel. Determining, via the one or more autonomous vehicle processors, when, or the time period of when, the train will pass through or be passing through the railroad crossing or the other railroad crossing based upon the train telematics data may be based upon at least one of (1) at least one of the GPS location, the speed, the heading, the route, or the track data, or (2) comparison via the one or more autonomous vehicle processors of the at least one of the GPS location, the speed, the heading, the route, or the track data with a GPS location of the railroad crossing or the other railroad crossing and a current time.

The method may include at least one of displaying, adjusting or generating an insurance discount for vehicles having risk mitigation or prevention functionality associated with receiving a wireless communication broadcast including the train telematics data, analyzing the train telematics data, and directing corrective actions based upon the train telematics data, and/or at least one of displaying, adjusting or generating a time or mileage usage-based insurance discount for vehicles based upon an amount of usage of risk mitigation or prevention functionality associated with receiving a wireless communication broadcast including the train telematics data, analyzing the train telematics data, and directing corrective actions based upon the train telematics data. The method may include additional, less, or alternate functionality, including that discussed elsewhere herein, and/or may be implemented via one or more local or remote processors, transceivers, memory units, and other electronic componentry. The train telematics data may include the types of telematics data discussed elsewhere herein.

Exemplary System of Using Train Telematics Data

As depicted by, and discussed in relation to, FIGS. 1, 2, and 6, for example, in one aspect, a system of using train telematics data to reduce risk of accidents may be provided. The system may include an autonomous (or semi-autonomous) vehicle with at least one of one or more processors or transceivers configured to: (1) receive the train telematics data associated with a train directly from a train transceiver or indirectly from a railroad crossing, the train telematics data including at least one of GPS location, speed, route, heading, acceleration, or track data; (2) determine when the train will pass through the railroad crossing or another railroad crossing based upon the train telematics data; and/or (3) determine an alternate route for the autonomous vehicle to take to avoid waiting at the railroad crossing or the other railroad crossing while the train is passing through to facilitate avoidance of train-vehicle collisions and safer vehicle and train travel. Determining when the train will pass through the railroad crossing or the other railroad crossing based upon the train telematics data may be based upon comparison via the one or more processors of at least one of the GPS location, the speed, the route, the heading, or the track data with a GPS location of the railroad crossing or the other railroad crossing and a current time.

The autonomous vehicle may be further configured to: broadcast a message to other autonomous vehicles that does one or more of (1) directs the other autonomous vehicles to travel along at least one alternate route that completely avoids the railroad crossing or the other railroad crossing, or (2) directs the other autonomous vehicles to automatically stop at the railroad crossing or the other railroad crossing during a predetermined time period to allow the train to pass unimpeded to facilitate avoidance of train-vehicle collisions. The system may be further configured to at least one of display, adjust, or generate an insurance discount for vehicles having risk mitigation or prevention functionality associated with receiving a wireless communication broadcast including the train telematics data, analyzing the train telematics data, and directing corrective actions based upon the train telematics data. The system may include additional, less, or alternate functionality, including that discussed elsewhere herein, and the train telematics data may include the types of telematics data discussed elsewhere herein.

Exemplary System Configured to Use Train Telematics Data

As depicted by, and discussed in relation to, FIGS. 1, 2, 7, and 8, for example, in one aspect, a computer system configured to use train telematics data to reduce risk of accidents via a mobile device traveling within a vehicle may be provided. The computer system may include the mobile device having at least one of one or more processors or transceivers, the at least one of the one or more processors or the transceivers configured to: (1) receive, via wireless communication or data transmission, train telematics data associated with a train directly from a train transceiver or indirectly from a railroad crossing, the train telematics data including at least one of GPS location, speed, route, heading, acceleration, or track data; (2) determine when, or a time period of when, the train will pass through, be passing through, or be within a predetermined distance of the railroad crossing or another railroad crossing based upon the train telematics data; (3) determine an alternate route for the vehicle to take to avoid waiting at the railroad crossing or the other railroad crossing to allow for the train to pass unimpeded; and/or (4) cause the alternate route to be displayed on a display of the mobile device or a vehicle navigation system to allow the train to pass unimpeded and to facilitate avoidance of train-vehicle collisions. The at least one of the one or more processors or the transceivers may be configured to determine when, or the time period of when, the train will pass through, be passing through, or be within the predetermined distance of the railroad crossing or the other railroad crossing based upon at least one of (1) at least one of the GPS location, the speed, the heading, the route, or the track data, or (2) comparison via the one or more processors of the at least one of the GPS location, the speed, the heading, the route, or the track data with a GPS location of the railroad crossing or the other railroad crossing and a current time.

The system may be further configured to at least one of display, adjust, or generate an insurance discount for vehicles having risk mitigation or prevention functionality associated with receiving a wireless communication broadcast including the train telematics data, analyzing the train telematics data, and directing corrective actions based upon the train telematics data, and/or a time or mile usage-based insurance discount for vehicles based upon an amount of usage of risk mitigation or prevention functionality associated with receiving a wireless communication broadcast including the train telematics data, analyzing the train telematics data, and directing corrective actions based upon the train telematics data. The system may include additional, less, or alternate functionality, including that discussed elsewhere herein, and the train telematics data may include the types of telematics data discussed elsewhere herein.

Exemplary Method of Using Train Telematics Data

As depicted by, and discussed in relation to, FIGS. 1, 2, 7, and 8, for example, in another aspect, a computer-implemented method of using train telematics data to reduce risk of accidents via a mobile device traveling within a vehicle may be provided. The method may include (1) receiving, via at least one of one or more processors of the mobile device or associated transceivers via wireless communication or data transmission, the train telematics data associated with a train directly from a train transceiver or indirectly from a railroad crossing, the train telematics data including at least one of GPS location, speed, route, heading, acceleration, or track data; (2) determining, via the one or more processors of the mobile device based upon the train telematics data, (1) when, or a time period of when, the train will pass through or be passing through the railroad crossing or another railroad crossing, or (2) when the train is within a predetermined distance of the railroad crossing or the other railroad crossing; (3) determining, via the one or more processors of the mobile device, an alternate route for the vehicle to take to avoid waiting at the railroad crossing or the other railroad crossing to allow for the train to pass; and/or (4) causing, via the one or more processors of the mobile device, the alternate route to be displayed on a display of the mobile device or a vehicle navigation system to allow the train to pass unimpeded and to facilitate avoidance of train-vehicle collisions. Determining, via the one or more processors of the mobile device, when, or the time period of when, the train will one of pass through, be passing through, or be within a predetermined distance of the railroad crossing or the other railroad crossing based upon the train telematics data may be based upon at least one of (1) at least one of the GPS location, the speed, the heading, the route, or the track data, or (2) comparison via the one or more processors of the mobile device of the at least one of the GPS location, the speed, the heading, the route, or the track data with a GPS location of the railroad crossing or the other railroad crossing and a current time.

The method may include at least one of displaying, adjusting, or generating an insurance discount for vehicles having risk mitigation or prevention functionality associated with receiving a wireless communication broadcast including the train telematics data, analyzing the train telematics data, and directing corrective actions based upon the train telematics data, and/or a time or mile usage-based insurance discount for vehicles based upon an amount of usage of risk mitigation or prevention functionality associated with receiving a wireless communication broadcast including the train telematics data, analyzing the train telematics data, and directing corrective actions based upon the train telematics data.

The foregoing method may include additional, less, or alternate functionality, including that discussed elsewhere herein, and may employ the types of telematics and/or digital data, and/or the Telematics App, discussed elsewhere herein. The foregoing method may be implemented via one or more local or remote processors, transceivers, memory units, and other electronic componentry, and/or via computer-executable instructions stored on non-transitory computer-readable media or medium.

Exemplary Method for Utilizing Train Telematics Data

As depicted by, and discussed in relation to, FIGS. 1, 2, 7, and 8, for example, in another aspect, a computer-implemented method for utilizing train telematics data may be provided. The method may include (1) receiving, by a first mobile computing device located in a vehicle, the train telematics data from a second mobile computing device located on a train, the train telematics data including information indicative of at least one of a speed, a heading, or a location of the train; (2) determining, by the first mobile computing device, at least one of a speed, a location, or a route of the vehicle; (3) determining, by the first mobile computing device based upon a comparison between (1) the at least one of the speed, the location, or the route of the vehicle, and (2) the at least one of the speed, the heading, or the location of the train derived from the train telematics data, whether the vehicle will be able to cross a railroad crossing before at least one of (1) a crossing signal associated with the railroad crossing is sounded or (2) the train is within a threshold distance from the railroad crossing; and/or (4) issuing at least one of an audible alarm or a visual alarm when it is determined by the first mobile computing device that the vehicle will not be able to cross the railroad crossing before the at least one of (1) the crossing signal is sounded or (2) the train is within the threshold distance from the railroad crossing. The method may include adjusting, by the first mobile computing device, a currently calculated driving route, when it is determined by the first mobile computing device that the vehicle will not be able to cross the railroad crossing before the at least one of (1) the crossing signal is sounded or (2) the train is within the threshold distance from the railroad crossing, wherein the adjusted route avoids the railroad crossing. The method may also or alternatively include receiving, by a smart railroad crossing infrastructure, the train telematics data from the second mobile computing device; and broadcasting, by the smart railroad crossing infrastructure, the train telematics data received from the second mobile computing device so that the act of receiving, by the first mobile computing device, the train telematics data from the second mobile computing device comprises receiving, by the first mobile computing device, the train telematics data from the second mobile computing device via the smart railroad crossing infrastructure.

The foregoing method may include additional, less, or alternate functionality, including that discussed elsewhere herein, and may employ the types of telematics and/or digital data, and/or the Telematics App, discussed elsewhere herein. The foregoing method may be implemented via one or more local or remote processors, transceivers, memory units, and other electronic componentry, and/or via computer-executable instructions stored on non-transitory computer-readable media or medium.

ADDITIONAL CONSIDERATIONS

With the foregoing, an insurance customer may opt-in to a rewards, insurance discount, or other type of program.

After the insurance customer provides their affirmative consent, an insurance provider telematics application and/or remote server may collect telematics and/or other data (including image or audio data) associated with insured assets, including before, during, and/or after an insurance-related event or vehicle collision. In return, risk-averse drivers, and/or vehicle owners may receive discounts or insurance cost savings related to auto, home, life, and/or other types of insurance from the insurance provider.

In one aspect, telematics data, and/or other data, including the types of data discussed elsewhere herein, may be collected or received by an insured's mobile device or smart vehicle, a Telematics App (including those discussed herein), and/or an insurance provider remote server, such as via direct or indirect wireless communication or data transmission from a Telematics App running on the insured's mobile device, after the insured or customer affirmatively consents or otherwise opts-in to an insurance discount, reward, or other program. The insurance provider may then analyze the data received with the customer's permission to provide benefits to the customer. As a result, risk-averse customers may receive insurance discounts or other insurance cost savings based upon data that reflects low risk driving behavior and/or technology that mitigates or prevents risk to (i) insured assets, such as vehicles or even homes, and/or (ii) vehicle operators or passengers.

Although the disclosure provides several examples in terms of two vehicles, two mobile computing devices, two on-board computers, one train, etc., aspects include any suitable number of computing devices, vehicles, trains, etc. For example, aspects include an external computing device receiving telematics data and/or geographic location data from a large number of computing devices (e.g., 100 or more mobile computing devices), and issuing alerts to those computing devices in which the alerts are relevant in accordance with the various techniques described herein.

Although the foregoing text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors, and/or processor-implemented modules, may be located in a single location (e.g., within a vehicle environment, a train environment, an infrastructure component, a home environment, an office environment or as a server farm), while in other embodiments the processor(s) and/or processor-implemented modules may be distributed across a number of locations.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One may implement numerous alternate embodiments, using either current technology or technology developed after the filing date of this application.

What is claimed:

1. A computer system configured to use train telematics data to reduce accident risk, the computer system comprising:
at least one of one or more processors or one or more associated transceivers, the at least one of the one or more processors or the one or more associated transceivers located on or within an autonomous vehicle, the at least one of the one or more processors or the one or more associated transceivers configured to:
receive, at the autonomous vehicle via wireless communication or data transmission, the train telematics data associated with a train, the train telematics data including location data and at least one of acceleration data or deceleration data;
determine, at the autonomous vehicle based upon the train telematics data, (1) an indication of when the train will pass through the railroad crossing or another railroad crossing, or (2) an indication of when the train will be within a predetermined distance of the railroad crossing or the another railroad crossing;
determine, at the autonomous vehicle based upon a relevance of the train, an alternate route for the autonomous vehicle to take to avoid waiting at the railroad crossing or the another railroad crossing to allow for the train to pass through the railroad crossing or the another railroad crossing, the relevance of the train being based upon (1) the indication of when the train will pass through the railroad crossing or the another railroad crossing, or (2) the indication of when the train will be within the predetermined distance of the railroad crossing or the another railroad crossing;
direct, based upon the relevance of the train, the autonomous vehicle to one of (1) automatically travel along the alternate route, or (2) automatically stop at the railroad crossing or the another railroad crossing to allow the train to pass through the railroad crossing or the another railroad crossing; and
cause an insurance provider remote server to at least one of display, adjust, or generate an insurance discount associated with the autonomous vehicle based upon the autonomous vehicle including risk mitigation or prevention functionality associated with (1) receiving the train telematics data, and (2) directing corrective actions based upon the relevance of the train, so as to incentivize the insured customer to facilitate avoidance of train-vehicle collisions and safer train and vehicle travel.

2. The computer system of claim 1, wherein the at least one of the one or more processors or the one or more associated transceivers are configured to determine, based upon (1) the indication of when the train will pass through the railroad crossing or the another railroad crossing, or (2) the indication of when the train will be within the predetermined distance of the railroad crossing or the another railroad crossing, and further based upon telematics data associated with the autonomous vehicle, an indication of whether the autonomous vehicle will be able to drive through the railroad crossing or the another railroad crossing without the train being within a threshold distance from the railroad crossing or the another railroad crossing so as to determine the relevance of the train.

3. The computer system of claim 2, wherein the telematics data associated with the autonomous vehicle includes at least one of location, acceleration, deceleration, braking, cornering, direction, heading, left turn, right turn, speed, lane, or gyroscope data associated with the autonomous vehicle.

4. The computer system of claim 1, wherein the at least one of the one or more processors or the one or more associated transceivers are configured to determine the indication of when the train will pass through the railroad crossing or the another railroad crossing based upon at least one of (1) at least one of the location data or the at least one of the acceleration data or the deceleration data, or (2) comparison via the one or more processors of (i) the at least one of the location data or the at least one of the acceleration data or the deceleration data with (ii) at least one of a current time or location data of one of the railroad crossing or the another railroad crossing.

5. The computer system of claim 1, wherein the train telematics data includes one or more of time, braking, cornering, direction, heading, left turn, right turn, speed, track, GPS (Global Positioning System) latitude and longitude, gyroscope, battery level, or telephone usage data associated with the train.

6. The computer system of claim 1, further comprising the insurance provider remote server, wherein the at least one of the one or more processors or the one or more associated transceivers are configured to send an indication to the insurance provider remote server that the autonomous vehicle includes the risk mitigation or prevention functionality associated with (1) receiving the train telematics data, and (2) directing the corrective actions based upon the relevance of the train, so as to cause the insurance provider remote server to at least one of display, adjust, or generate the insurance discount associated with the autonomous vehicle.

7. The computer system of claim 6, wherein the at least one of the one or more processors or the one or more associated transceivers are configured to send an indication of an amount of usage of the risk mitigation or prevention functionality to the insurance provider remote server so as to cause the insurance provider remote server to at least one of display, adjust, or generate the insurance discount as a time or mileage usage-based insurance discount.

8. A computer-implemented method of using train telematics data to reduce accident risk, the method comprising:
receiving, at an autonomous vehicle via at least one of one or more processors or one or more associated transceivers located on or within the autonomous vehicle, via wireless communication or data transmission, the train telematics data associated with a train, the train telematics data including location data and at least one of acceleration data or deceleration data;
determining, at the autonomous vehicle via the one or more processors based upon the train telematics data, (1) an indication of when the train will pass through the railroad crossing or another railroad crossing, or (2) an indication of when the train will be within a predetermined distance of the railroad crossing or the another railroad crossing;
determining, at the autonomous vehicle via the one or more processors, based upon a relevance of the train, an alternate route for the autonomous vehicle to take to avoid waiting at the railroad crossing or the another railroad crossing to allow for the train to pass through the railroad crossing or the another railroad crossing, the relevance of the train being based upon (1) the indication of when the train will pass through the railroad crossing or the another railroad crossing, or (2) the indication of when the train will be within the predetermined distance of the railroad crossing or the another railroad crossing;
directing, via the one or more processors, based upon the relevance of the train, the autonomous vehicle to one of (1) automatically travel along the alternate route, or (2) automatically stop at the railroad crossing or the another railroad crossing to allow the train to pass through the railroad crossing or the another railroad crossing; and
causing, via the at least one of the one or more processors or the one or more associated transceivers, an insurance provider remote server to at least one of display, adjust, or generate an insurance discount associated with the autonomous vehicle based upon the autonomous vehicle including risk mitigation or prevention functionality associated with (1) receiving the train telematics data, and (2) directing corrective actions based upon the relevance of the train, so as to incentivize the insured customer to facilitate avoidance of train-vehicle collisions and safer train and vehicle travel.

9. The computer-implemented method of claim 8, the method comprising determining, via the one or more processors, the relevance of the train by determining, based upon (1) the indication of when the train will pass through the railroad crossing or the another railroad crossing, or (2) the indication of when the train will be within the predetermined distance of the railroad crossing or the another railroad crossing, and further based upon telematics data associated with the autonomous vehicle, an indication of whether the autonomous vehicle will be able to drive through the railroad crossing or the another railroad crossing without the train being within a threshold distance from the railroad crossing or the another railroad crossing.

10. The computer-implemented method of claim 9, wherein the telematics data associated with the autonomous vehicle includes at least one of location, acceleration, deceleration, braking, cornering, direction, heading, left turn, right turn, speed, lane, or gyroscope data associated with the autonomous vehicle.

11. The computer-implemented method of claim 8, wherein determining, via the one or more processors, the indication of when the train will pass through the railroad crossing or the another railroad crossing is based upon at least one of (1) at least one of the location data or the at least one of the acceleration data or the deceleration data, or (2) comparison of (i) the at least one of the location data or the at least one of the acceleration data or the deceleration data with (ii) at least one of a current time or location data of one of the railroad crossing or the another railroad crossing.

12. The computer-implemented method of claim 8, wherein the train telematics data includes one or more of time, braking, cornering, direction, heading, left turn, right turn, speed, track, GPS (Global Positioning System) latitude and longitude, gyroscope, battery level, or telephone usage data associated with the train.

13. The computer-implemented method of claim 8, the method comprising sending, via the at least one of the one or more processors or the one or more associated transceivers, an indication to the insurance provider remote server that the autonomous vehicle includes the risk mitigation or prevention functionality associated with (1) receiving the train telematics data, and (2) directing the corrective actions based upon the relevance of the train, so as to cause the insurance provider remote server to at least one of display, adjust, or generate the insurance discount associated with the autonomous vehicle.

14. The computer-implemented method of claim 13, the method comprising sending, via the at least one of the one or more processors or the one or more associated transceivers, an indication of an amount of usage of the risk mitigation or prevention functionality to the insurance provider remote server so as to cause the insurance provider remote server to at least one of display, adjust, or generate the insurance discount as a time or mileage usage-based insurance discount.

15. A system of using train telematics data to reduce accident risk, the system comprising:
an autonomous vehicle; and
at least one of one or more processors or one or more transceivers located on or within the autonomous vehicle, the at least one of the one or more processors or the one or more transceivers configured to:
receive the train telematics data associated with a train, the train telematics data including location data and at least one of acceleration data or deceleration data;
determine, based upon the train telematics data, an indication of when the train will pass through a railroad crossing or another railroad crossing;
determine, based upon a relevance of the train, an alternate route for the autonomous vehicle to take to avoid waiting at the railroad crossing or the another railroad crossing to allow for the train to pass through the railroad crossing or the another railroad crossing, the relevance of the train being based upon the indication of when the train will pass through the railroad crossing or the another railroad crossing; and
cause an insurance provider remote server to at least one of display, adjust, or generate an insurance discount associated with the autonomous vehicle based upon the autonomous vehicle having risk mitigation or prevention functionality associated with (1) receiving the train telematics data, and (2)

directing corrective actions based upon the relevance of the train, so as to incentivize the insured customer to facilitate avoidance of train-vehicle collisions and safer train and vehicle travel.

16. The system of claim 15, wherein the at least one of the one or more processors or the one or more transceivers are configured to determine, based upon the indication of when the train will pass through the railroad crossing or the another railroad crossing and further based upon telematics data associated with the autonomous vehicle, an indication of whether the autonomous vehicle will be able to drive through the railroad crossing or the another railroad crossing without the train being within a threshold distance from the railroad crossing or the another railroad crossing so as to determine the relevance of the train.

17. The system of claim 16, wherein the telematics data associated with the autonomous vehicle includes at least one of location, acceleration, deceleration, braking, cornering, direction, heading, left turn, right turn, speed, lane, or gyroscope data associated with the autonomous vehicle.

18. The system of claim 15, wherein the train telematics data includes one or more of time, braking, cornering, direction, heading, left turn, right turn, speed, track, GPS (Global Positioning System) latitude and longitude, gyroscope, battery level, or telephone usage data associated with the train.

19. The system of claim 15, wherein the at least one of the one or more processors or the one or more transceivers are configured to broadcast an indication to one or more additional autonomous vehicles to one of (1) direct the one or more additional autonomous vehicles to travel along one or more alternate routes to avoid waiting at the railroad crossing or the another railroad crossing, or (2) direct the one or more additional autonomous vehicles to automatically stop at the railroad crossing or the another railroad crossing to allow the train to pass through the railroad crossing or the another railroad crossing.

20. The system of claim 15, further comprising the insurance provider remote server, wherein the at least one of the one or more processors or the one or more transceivers are configured to send an indication to the insurance provider remote server that the autonomous vehicle includes the risk mitigation or prevention functionality associated with (1) receiving the train telematics data, and (2) directing the corrective actions based upon the relevance of the train, so as to cause the insurance provider remote server to at least one of display, adjust, or generate the insurance discount associated with the autonomous vehicle.

\* \* \* \* \*